(12) United States Patent
Son et al.

(10) Patent No.: US 11,644,025 B2
(45) Date of Patent: May 9, 2023

(54) LINEAR COMPRESSOR

(71) Applicant: LG Electronics Inc., Seoul (KR)

(72) Inventors: Sangik Son, Seoul (KR); Youngpil Kim, Seoul (KR); Kyungmin Lee, Seoul (KR); Wooju Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 17/078,552

(22) Filed: Oct. 23, 2020

(65) Prior Publication Data

US 2021/0123428 A1 Apr. 29, 2021

(30) Foreign Application Priority Data

Oct. 24, 2019 (KR) .................. 10-2019-0133148

(51) Int. Cl.
| | |
|---|---|
| F04B 39/16 | (2006.01) |
| F04B 35/04 | (2006.01) |
| F04B 39/12 | (2006.01) |
| F04B 39/02 | (2006.01) |
| B01D 39/16 | (2006.01) |
| B01D 46/02 | (2006.01) |

(52) U.S. Cl.
CPC ............ *F04B 39/16* (2013.01); *F04B 35/045* (2013.01); *F04B 39/0292* (2013.01); *F04B 39/123* (2013.01); *F04B 39/126* (2013.01); *B01D 39/1692* (2013.01); *B01D 46/02* (2013.01); *F05B 2210/14* (2013.01)

(58) Field of Classification Search
CPC .... F04B 39/16; F04B 39/0292; F04B 39/123; F04B 39/126; F04B 35/045; F05B 2201/14; B01D 39/1692; B01D 46/02
See application file for complete search history.

(56) References Cited

U.S. PATENT DOCUMENTS

| | | | | |
|---|---|---|---|---|
| 5,862,855 | A * | 1/1999 | Balk ................. | C09K 5/16 62/480 |
| 2015/0078925 | A1 * | 3/2015 | Choi ................. | F04B 39/16 417/228 |

(Continued)

FOREIGN PATENT DOCUMENTS

| | | |
|---|---|---|
| EP | 2780593 | 9/2014 |
| EP | 3249223 | 11/2017 |

(Continued)

OTHER PUBLICATIONS

Korean Office Action in Korean Appln. No. 10-2019-0133148, dated Sep. 21, 2020, 10 pages (with English translation).

(Continued)

*Primary Examiner* — Charles G Freay
(74) *Attorney, Agent, or Firm* — Fish & Richardson P.C.

(57) ABSTRACT

A compressor includes a cylinder comprising a cylinder body which has a cylindrical shape and defining a compression space for refrigerant gas, a piston configured to be reciprocated in an axial direction within the cylinder body and to compress the refrigerant gas in the compression space, and a frame in which the cylinder is received, the frame defining a gas hole, one side of the gas hole communicating with outside so that the refrigerant gas is introduced, the other side of the gas hole extending up to an inner circumferential surface so as to guide the refrigerant gas.

19 Claims, 28 Drawing Sheets

(56) References Cited

U.S. PATENT DOCUMENTS

2015/0369225 A1* 12/2015 Ha ..................... F04B 39/122
                                                                                417/443
2017/0321684 A1* 11/2017 Han ..................... F04B 35/04

FOREIGN PATENT DOCUMENTS

| EP | 3372834 | | 9/2018 |
|----|---------|---|--------|
| EP | 3569861 A1 * | | 5/2019 |
| KR | 1020130026880 | | 3/2013 |
| KR | 1020140100965 | | 8/2014 |
| KR | 20180039959 | | 4/2018 |
| KR | 101966191 | | 4/2019 |
| KR | 1020020010261 | | 2/2020 |
| WO | WO2013071382 | | 5/2013 |

OTHER PUBLICATIONS

Extended European Search Report in EP Appln. No. 202033232.9, dated Dec. 23, 2020, 4 pages.

* cited by examiner

FIG. 5
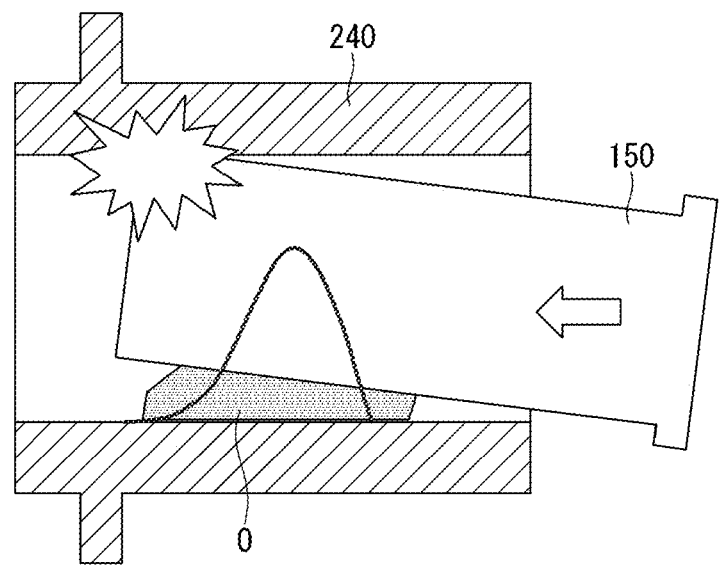
(a)
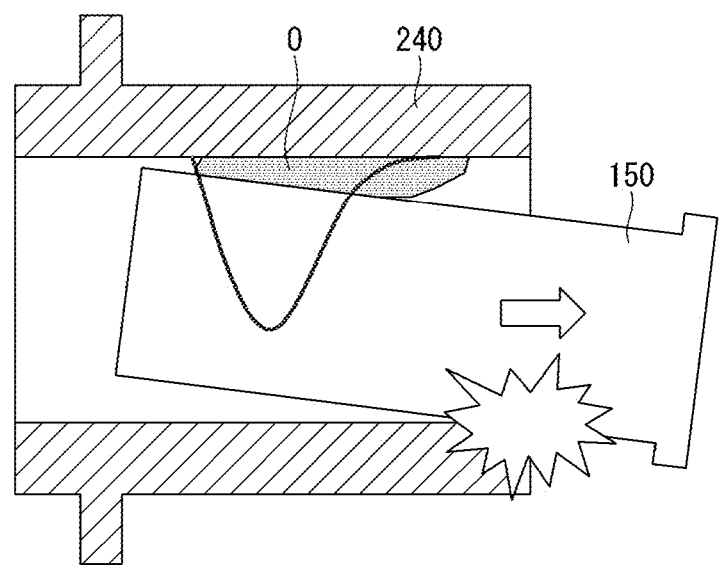
(b)

LINEAR COMPRESSOR

CROSS-REFERENCE TO RELATED APPLICATION

This application is based on and claims the benefit of priority to Korean Patent Application No. 10-2019-0133148, filed on Oct. 24, 2019, in the Korean Intellectual Property Office, the disclosure of which is incorporated herein in its entirety by reference.

TECHNICAL FIELD

The present disclosure relates to a compressor. More particularly, the present disclosure relates to a linear compressor for compressing a refrigerant by a linear reciprocating motion of a piston.

BACKGROUND

In general, a compressor refers to an apparatus configured to receive power from a power generation device such as a motor or a turbine and compress a working fluid such as air or refrigerant. Compressors are widely applied to the whole industry or home appliances, and in particular, a steam compression refrigeration cycle (hereinafter referred to as a "refrigeration cycle").

Compressors may be classified into reciprocating compressors, rotary compressors, and scroll compressors according to a refrigerant compressing method.

In the reciprocating compressors, a compression space is defined between a piston and a cylinder, and the piston is linearly reciprocated to compress a fluid. The rotary compressors compress a fluid using a roller that eccentrically rotates in a cylinder. The scroll compressors compress a fluid by rotating a pair of spiral scrolls.

Recently, the use of linear compressors using a linear reciprocating motion, without a crankshaft, among the reciprocating compressors has gradually increased. Linear compressors improve the efficiency of compressor and have a relatively simple structure because there is little mechanical loss in converting a rotational motion into a linear reciprocating motion.

Linear compressor may be configured such that a cylinder is positioned in a casing defining a sealing space to form a compression chamber, and a piston covering the compression chamber is reciprocated within the cylinder. The linear compressors repeat a process in which the fluid in the sealing space is suctioned into the compression chamber while the piston is positioned at a bottom dead center (BDC), and the fluid in the compression chamber is compressed while the piston is positioned at a top dead center (TDC).

Meanwhile, the linear compressors may be classified into oil-lubricated linear compressors and gas-lubricated linear compressors according to a lubrication method.

In the oil-lubricated linear compressors, when oil discharged to a refrigeration cycle device together with a refrigerant is not smoothly recovered by a compressor, the lack of oil may occur in a casing of the compressor, and the lack of oil in the casing may cause the reliability of the compressor to deteriorate.

Meanwhile, the gas-lubricated linear compressors can be downsized as compared with the oil-lubricated linear compressors, and because the cylinder and the piston are lubricated with a refrigerant, the reliability of compressor does not deteriorate due to the lack of oil.

However, in the conventional gas-lubricated linear compressor, oil is introduced between the cylinder and the piston, and thus, the lubrication performance rapidly deteriorates. In particular, oil introduced into a sliding portion acts like an airbag, or causes a phenomenon that pushes the piston to one side by generating force from a high dynamic pressure. As a result, the piston comes into contact with the cylinder, which weakens the durability and reliability of the compressor.

Korean Patent Laid-Open Publication No. 10-2018-0039959 discloses a technology in which a thread is wound around a gas inlet and used as a filter member so as to prevent oil from entering. According to this technology, after a thread filter is wound around a cylinder body, a part of the surface of the thread filter is heat-sealed so that the thread filter is fixed to the surface of the cylinder body. When a compressor is coupled, or depending on an operating environment, as time elapses, the heat-sealed portion is damaged and the tension decreases. When the tension of the thread filter decreases, not only a filter function but also a restrictor function may be weakened and the performance of a gas bearing may be deteriorated.

In addition, the thread filter is wound and fastened in a state in which tension is applied to the gas inlet grooved in the cylinder body. At this time, there is a possibility that deformation will occur in the cylinder body, and for this reason, the performance of the gas bearing may be degraded.

PRIOR ART DOCUMENT (Patent Document 1) Korean Patent Laid-Open Publication No. 10-2018-0039959 (published on Apr. 19, 2018)

SUMMARY

The present disclosure provides a compressor capable of preventing oil from flowing into a sliding portion by maintaining uniform filter performance without decreasing filter performance due to a decrease in filter tension during compressor operation, and the like.

In addition, the present disclosure provides a compressor capable of preventing the occurrence of a problem in driving the compressor due to an unfavorable gas bearing function due to the clogging of a supply port of a gas inlet.

Furthermore, the present disclosure provides a compressor in which a filter may be easily mounted to a gas inlet, and the uniform performance of the mounted filter may be expected without changing according to an assembly.

Particular implementations of the present disclosure provides a compressor that includes a cylinder, a piston, and a frame. The cylinder may include a cylinder body and define a compression space for receiving a refrigerant gas. The piston may be configured to reciprocate within the cylinder body and compress the refrigerant gas in the compression space. The frame may receive the cylinder and define a gas hole. The gas hole may fluidly communicate with an outside of the frame and allows introduction of the refrigerant gas into an interior of the frame. The gas hole may fluidly communicate with a gas pocket that is defined between an outer circumferential surface of the cylinder and an inner circumferential surface of the frame. The cylinder may include a nozzle, a gas inlet, and a porous filter. The nozzle may extend through the cylinder body and enable the gas pocket to fluidly communicate with an inner space of the cylinder body. The gas inlet may include a first groove at the outer circumferential surface of the cylinder and fluidly communicate with an inlet of the nozzle. The porous filter may be seated in the gas inlet and configured to filter the refrigerant gas introduced into the nozzle.

In some implementations, the compressor can optionally include one or more of the following features. The porous filter may define fine holes and be configured to filter oil or dirt from the refrigerant gas that flows through the gas pocket. The fine holes may be configured to prevent oil or dirt of 20 micrometers or greater from passing from the gas pocket to the nozzle. The porous filter may include a hollow tube shape that defines an inner passage through which the refrigerant gas flows. The gas inlet may define a second groove that extends along an outer circumferential surface of the cylinder body in a circumferential direction. The porous filter may be seated at the gas inlet and at least partially surround the cylinder body in the circumferential direction. The porous filter may include a ring shape that surrounds the cylinder body. The porous filter may be configured to be elastic and contacts an inner wall of the gas inlet. The porous filter may include a ring shape that surrounds the cylinder body. A diameter of a cross-section of the porous filter may be greater than a width of the gas inlet so that the porous filter is press-fitted to the gas inlet. The porous filter may include a ring shape that surrounds the cylinder body and be bonded to an inner wall of the gas inlet by a thermosetting resin. The porous filter may include a ring shape that has a partially cut-out portion and may surround the cylinder body. The compressor may further include a connector that has opposite ends. The opposite ends of the connector may be respectively inserted into a first cut-out end and a second cut-out end of the porous filter and connect the porous filter.

The porous filter may include a hollow tube shape that defines an inner passage through which the refrigerant gas flows. The connector may seal the first cut-out end and the second cut-out end of the porous filter and seals the inner passage. The porous filter may include a ring shape that has a partially cut-out portion and may surround the cylinder body. A first cut-out end of the porous filter may be inserted into a second cut-out end of the porous filter to define a complete ring shape of the porous filter. The first cut-out end of the porous filter may include a coupling protrusion, and the second cut-out end of the porous filter may include a coupling groove that corresponds to the coupling protrusion and be configured to receive the coupling protrusion. The gas inlet may define a third groove that extends in a longitudinal direction of the cylinder body. The porous filter may extend in the longitudinal direction of the cylinder body. The nozzle may be a first nozzle that is positioned at a first side of the cylinder body. The cylinder may include a second nozzle that is positioned at a second side of the cylinder body that is opposite to the first side of the cylinder body. The porous filter may extend from a position corresponding to the first nozzle to a position corresponding to the second nozzle. The nozzle may be a first nozzle that is positioned at a first side of the cylinder body. The cylinder may further include a second nozzle that is positioned at a second side of the cylinder body that is opposite to the first side of the cylinder body. The compressor may further include a front porous filter and a rear porous filter that are configured to respectively filter refrigerant gas introduced into the first nozzle and the second nozzle. The porous filter may include a hollow tube shape that defines an inner passage through which the refrigerant gas flows. The porous filter may be seated in the gas inlet and pressed and deformed between the inner circumferential surface of the frame and an outer circumferential surface of the cylinder body. Openings at opposite ends of the porous filter may be sealed by side surfaces of the gas inlet. The porous filter may include a porous polymer. The porous filter may include at least one of PTFE (polytetrafluoroethylene), ePTFE (expanded polytetrafluoroethylene), UHMWPE (Ultra High Molecular Weight Polyethylene), PE (polyethylene), PA (polyamide), PVDF (polyvinylidene fluoride), or PP (polypropylene). The gas pocket may define spacing between the inner circumferential surface of the frame and an outer circumferential surface of the cylinder body in a range of 10 micrometers to 30 micrometers. The compressor may further include a first sealing member and a second sealing member. The first sealing member may be positioned closer to a first side of the gas hole than an outlet of the gas hole and may be disposed between the cylinder and the frame so as to seal the first side of the gas hole. The second sealing member may be positioned closer to a second side of the gas hole than the outlet of the gas hole and may be disposed between the cylinder and the frame so as to seal the second side of the gas hole. The second side of the gas hole may be opposite to the first side of the gas hole. The gas pocket may include a space between the front sealing member and the rear sealing member. The compressor may include collection grooves that fluidly communicate with the gas pocket, that are recessed in a radial direction, and that are configured to collect oil or foreign substances. The collection grooves may be defined at the inner circumferential surface of the frame or an outer circumferential surface of the cylinder body.

A compressor according to an embodiment of the present disclosure includes a cylinder including a cylinder body which has a cylindrical shape and defining a compression space for refrigerant gas, a piston configured to be reciprocated in an axial direction within the cylinder body and to compress the refrigerant gas in the compression space, and a frame in which the cylinder is received, the frame defining a gas hole, one side of the gas hole communicating with outside so that the refrigerant gas is introduced, the other side of the gas hole extending up to an inner circumferential surface so as to guide the refrigerant gas, wherein the gas hole communicates with a gas pocket including a space between an outer circumferential surface of the cylinder and an inner circumferential surface of the frame, and the cylinder includes a nozzle passing through the cylinder body so as to communicate the gas pocket with an inner space of the cylinder body, a gas inlet provided in a shape of a groove recessed from the outer circumferential surface of the cylinder and communicating with an inlet of the nozzle, and a porous filter member seated in the gas inlet to filter the refrigerant gas introduced into the nozzle.

The porous filter member may be provided in a porous shape defining a fine hole for filtering oil or dirt contained in the refrigerant gas flowing through the gas pocket, and the fine hole may be provided to prevent oil or dirt of 20 micrometers or more from passing from the gas pocket to the nozzle.

The porous filter member may be provided in a hollow tube shape to define an inner passage through which the refrigerant gas flows.

The gas inlet may define a groove extending along an outer circumferential surface of the cylinder body in a circumferential direction, and the porous filter member may be seated on the gas inlet to entirely or partially surround the cylinder body in the circumferential direction.

The porous filter member may be provided in a ring shape surrounding the cylinder body, and the porous filter member may be provided to have elasticity and is in close contact with an inner wall of the gas inlet.

The porous filter member may be provided in a ring shape surrounding the cylinder body, and a diameter of a cross-section of the porous filter member may be greater than a width of the gas inlet so that the porous filter member is press-fitted to the gas inlet.

The porous filter member may be provided in a ring shape surrounding the cylinder body and may be bonded to an inner wall of the gas inlet by medium of a thermosetting resin.

The porous filter member may be provided in a ring shape having a partially cut-out portion surrounding the cylinder body, and the compressor may further include a connection member having one end and the other end respectively inserted into a first cut-out end and a second cut-out end, which form the cut-out portion, to connect the porous filter member.

The porous filter member may be provided in a hollow tube shape to define an inner passage through which the refrigerant gas flows, and the connection member may be provided to seal the first cut-out end and the second cut-out end of the porous filter member so as to seal the inner passage.

The porous filter member may be provided in a ring shape having a partially cut-out portion surrounding the cylinder body, and one end of the porous filter member may be inserted into the other end thereof so that the porous filter member is provided in a ring shape as a whole.

A first cut-out end provided at one end of the porous filter member may include a coupling protrusion, and a second cut-out end provided at the other end of the porous filter member may be provided in a shape corresponding to the coupling protrusion, thereby defining a coupling groove into which the coupling protrusion is inserted.

The gas inlet may define a groove extending in a longitudinal direction of the cylinder body, and the porous filter member may extend in the longitudinal direction of the cylinder body.

The nozzle may include a front nozzle positioned at a front side of the cylinder body and a rear nozzle positioned at a rear side of the cylinder body, and the porous filter member may extend from a position corresponding to the front nozzle to a position corresponding to the rear nozzle.

The nozzle may include a front nozzle positioned at a front side of the cylinder body and a rear nozzle positioned at a rear side of the cylinder body, and the compressor may further include a front porous filter member and a rear porous filter member respectively filtering refrigerant gas introduced into the front nozzle and the rear nozzle.

The porous filter member may be provided in a hollow tube shape to define an inner passage through which the refrigerant gas flows, the porous filter member may be seated in the gas inlet in a state of being pressed and deformed between the inner circumferential surface of the frame and an outer circumferential surface of the cylinder body, and openings at both ends of the porous filter member are sealed by side surfaces of the gas inlet.

The porous filter member may include a porous polymer.

The cylinder filter member may include any one of PTFE (polytetrafluoroethylene), ePTFE (expanded polytetrafluoroethylene), UHMWPE (Ultra High Molecular Weight Polyethylene), PE (polyethylene), PA (polyamide), PVDF (polyvinylidene fluoride), or PP (polypropylene).

The gas pocket may be provided so that an interval between the inner circumferential surface of the frame and an outer circumferential surface of the cylinder body is formed in a range of 10 micrometers to 30 micrometers.

The compressor may further include a front sealing member positioned closer to a front side of the gas hole than an outlet of the gas hole and disposed between the cylinder and the frame so as to seal the front side of the gas pocket, and a rear sealing member positioned closer to a rear side of the gas hole than an outlet of the gas hole and disposed between the cylinder and the frame so as to seal the rear side of the gas pocket, wherein the gas pocket may be defined as a space between the front sealing member and the rear sealing member.

Collection grooves communicating with the gas pocket and recessed in a radial direction to collect oil or foreign substances may be formed on the inner circumferential surface of the frame or an outer circumferential surface of the cylinder body.

The details of one or more embodiments are set forth in the accompanying drawings and the description below. Other features will be apparent from the description and drawings, and from the claims.

BRIEF DESCRIPTION OF THE DRAWINGS

FIG. 5 is a view showing a phenomenon occurring when oil is introduced into a sliding portion.

DETAILED DESCRIPTION OF THE EMBODIMENTS

Figure 1:
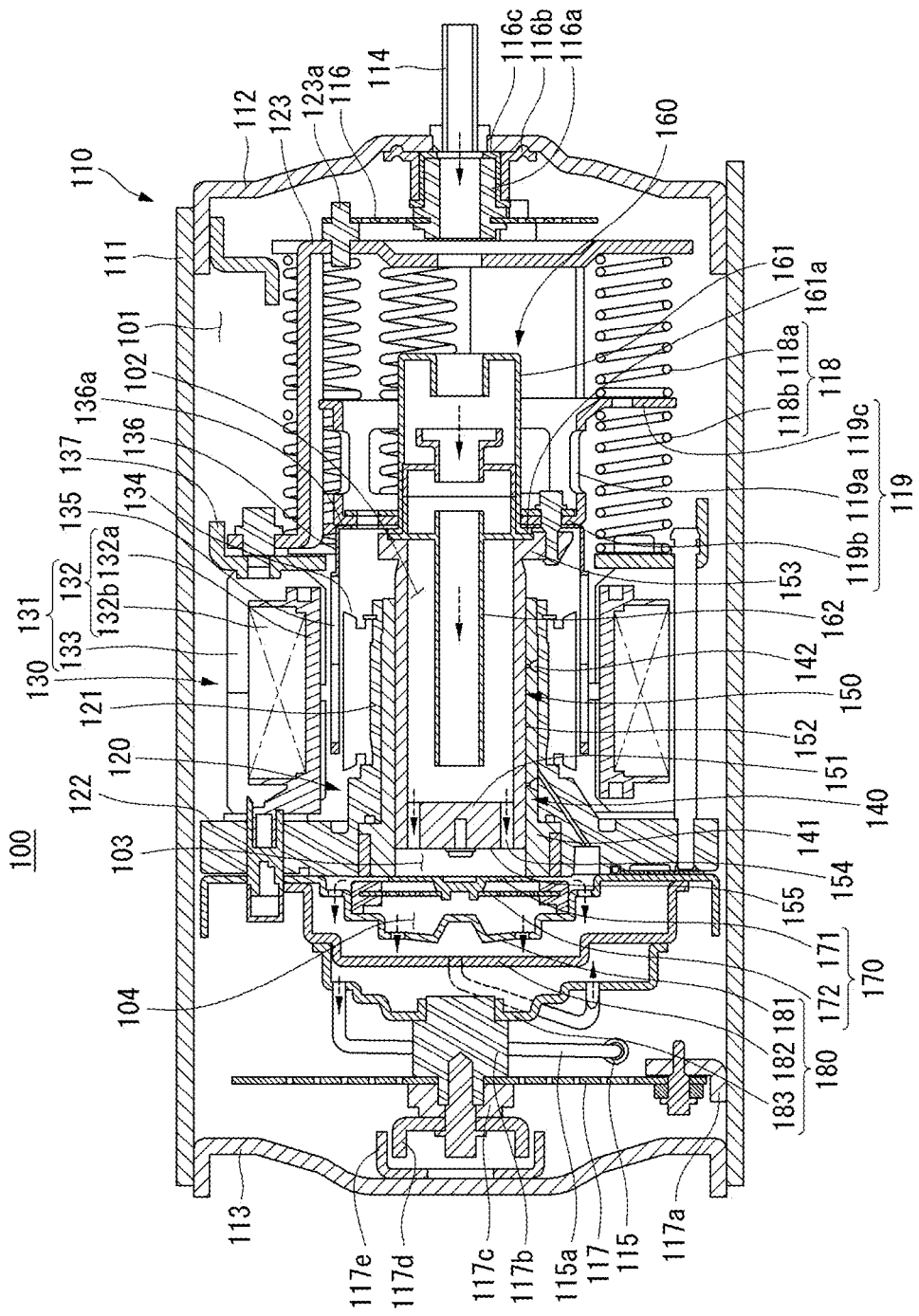
FIG. 1 is a cross-sectional view for explaining a structure of a compressor.

Hereinafter, embodiments of the present disclosure will be described in detail with reference to the accompanying drawings. When describing the embodiments of the present disclosure with reference to the accompanying drawings, the same or similar elements are denoted by the same reference numerals. Redundant descriptions thereof will be omitted.

In the following description, it will be understood that when an element is referred to as being "connected to" or "coupled to" another element, the element can be "directly connected to" or "directly coupled to" the other element, or intervening elements may also be present.

Also, when the detailed description of the relevant known technology is determined to unnecessarily obscure the gist of the present disclosure, detailed descriptions thereof may be omitted. In addition, the accompanying drawings are only for easy understanding of the embodiments disclosed in the present disclosure, and the technical idea disclosed in the present disclosure is not limited by the accompanying drawings. It will be understood as including all modifications, equivalents, and substitutes falling within the spirit and scope of the present disclosure.

On the other hand, the term "disclosure" can be interchangeably used with the term "document," "specification," or "description."

FIG. 1 is a cross-sectional view for explaining a structure of a compressor 100.

Hereinafter, a linear compressor that suctions and compresses a fluid while a piston performs a linear reciprocating motion, and discharges the compressed fluid will be described as an example of the compressor according to the present disclosure.

The linear compressor may be an element of a refrigeration cycle, and the fluid compressed in the linear compressor may be a refrigerant circulating in the refrigeration cycle. The refrigeration cycle includes, in addition to the compressor, a condenser, an expansion device, and an evaporator. The linear compressor may be used as an element of a cooling system of a refrigerator, but is not limited thereto and may be widely used in the whole industry.

Referring to FIG. 1, the compressor 100 includes a casing 110 and a main body accommodated in the casing 110. The main body includes a frame 120, a cylinder 140 fixed to the frame 120, a piston 150 that is linearly reciprocated in the cylinder 140, and a driving unit that is fixed to the frame to apply driving force to the piston 150. The cylinder 140 and the piston 150 may be referred to as compression units 140 and 150.

The compressor 100 may be provided with a bearing for reducing friction between the cylinder 140 and the piston 150. The bearing may be an oil bearing or a gas bearing. Alternatively, a mechanical bearing may be used as the bearing.

The main body of the compressor 100 may be elastically supported by support springs 116 and 117 installed at both inner ends of the casing 110. The support springs 116 and 117 may include a first support spring 116 for supporting the rear of the main body and a second support spring 117 for supporting the front of the main body. Leaf springs may be used as the support springs 116 and 117. The support springs 116 and 117 may absorb vibrations and shocks generated by the reciprocating motion of the piston 150, while supporting the internal parts of the main body.

The casing 110 may define an enclosed space. The enclosed space may include a receiving space 101 in which a suctioned refrigerant is received, a suction space 102 filled with an uncompressed refrigerant, a compression space 103 for compressing a refrigerant, and a discharge space 104 filled with a compressed refrigerant.

That is, the refrigerant suctioned from a suction pipe 114 connected to the rear side of the casing 110 is filled in the receiving space 101. The refrigerant in the suction space 102 communicating with the receiving space 101 is compressed in the compression space 103, is discharged to the discharge space 104, and is discharged to the outside through a discharge pipe 115 connected to the front side of the casing 110.

The casing 110 has a shell 111 formed in an elongated cylindrical shape in a substantially transverse direction, with both ends open, a first shell cover 112 coupled to the rear side of the shell 111, and a second shell cover 113 coupled to the front side of the shell 111. The front side is the left side of the drawing and refers to a direction in which the compressed refrigerant is discharged, and the rear side is the right side of the drawing and refers to a direction in which the refrigerant is introduced. In addition, the first shell cover 112 or the second shell cover 113 may be integrally formed with the shell 111.

The casing 110 may be made of a thermally conductive material. Therefore, heat generated in the inner space of the casing 110 may be quickly dissipated to the outside.

The first shell cover 112 may be coupled to the shell 111 to seal the rear side of the shell 111, and the suction pipe 114 may be inserted into and coupled to the center of the first shell cover 112.

The rear side of the main body of the compressor may be elastically supported to the first shell cover 112 through the first support spring 116 in the radial direction.

The first support spring 116 may be provided with a circular leaf spring. An edge of the first support spring 116 may be supported to a back cover 123 through a support bracket 123a in the front direction, and an opened central portion of the first support spring 116 may be supported to the first shell cover 112 through a suction guide 116a in the rear direction.

The suction guide 116a is formed in a cylindrical shape in which a passage is provided. The central opening of the first support spring 116 may be coupled to the front outer circumferential surface of the suction guide 116a, and the rear end of the suction guide 116a may be supported to the first shell cover 112. In this case, a separate suction-side support member 116b may be disposed between the suction guide 116a and the inner surface of the first shell cover 112.

The rear side of the suction guide 116a communicates with the suction pipe 114, and the refrigerant suctioned through the suction pipe 114 may pass through the suction guide 116a and smoothly flow into a muffler unit 160, which will be described later.

A damping member 116c made of a rubber material or the like may be installed between the suction guide 116a and the suction-side support member 116b. Accordingly, vibrations that may be generated while the refrigerant is suctioned through the suction pipe 114 may be prevented from being transmitted to the first shell cover 112.

The second shell cover 113 may be coupled to the shell 111 to seal the front side of the shell 111, and the discharge pipe 115 may be inserted and coupled through a loop pipe 115a. The refrigerant discharged from the compression space 103 may pass through a discharge cover assembly 180 and may be then discharged to the refrigeration cycle through the loop pipe 115a and the discharge pipe 115.

The front side of the main body of the compressor may be elastically supported to the shell 111 or the second shell cover 113 through the second support spring 117 in the radial direction.

The second support spring 117 may be provided with a circular leaf spring. The opened central portion of the second support spring 117 may be supported to the discharge cover assembly 180 through the first support guide 117b in the rear direction, and the edge of the second support spring 117 may be supported to the inner circumferential surface of the shell 111 or the inner circumferential surface of the shell 111 adjacent to the second shell cover 113 in the radial direction by the support bracket 117a. Alternatively, unlike the drawing, the edge of the second support spring 117 may be supported to the second shell cover 113 through a bracket (not shown) in the front direction.

The first support guide 117b may be formed in a continuous cylindrical shape with different diameters. The front side of the first support guide 117b may be inserted into the central opening of the second support spring 117, and the rear side of the first support guide 117b may be inserted into the central opening of the discharge cover assembly 180. The support cover 117c may be coupled to the front side of the first support guide 117b with the second support spring 117 interposed therebetween. A cup-shaped second support guide 117d that is recessed forward may be coupled to the front side of the support cover 117c, and a cup-shaped third support guide 117e that corresponds to the second support guide 117d and is recessed rearward may be coupled to the inside of the second shell cover 113. The second support guide 117d may be inserted into the third support guide 117e and supported in the axial direction and the radial direction. In this case, a gap may be defined between the second support guide 117d and the third support guide 117e.

The frame 120 includes a body portion 121 supporting the outer circumferential surface of the cylinder 140, and a flange portion 122 connected to one side of the body portion 121 and supporting the driving unit 130. The frame 120 may be elastically supported to the casing 110 by the first support spring 116 and the second support spring 117 together with the driving unit 130 and the cylinder 140.

The body portion 121 may be formed in a cylindrical shape surrounding the outer circumferential surface of the cylinder 140, and the flange portion 122 may extend from the front end of the body portion 121 in the radial direction.

The cylinder 140 may be coupled to the inner circumferential surface of the body portion 121, and an inner stator 134 may be coupled to the outer circumferential surface of the body portion 121. For example, the cylinder 140 may be press-fitted to the inner circumferential surface of the body portion 121, and the inner stator 134 may be fixed using a fixing ring.

An outer stator 131 may be coupled to the rear surface of the flange portion 122, and the discharge cover assembly 180 may be coupled to the front surface of the flange portion 122. For example, the outer stator 131 and the discharge cover assembly 180 may be fixed through a mechanical coupling means.

A bearing inlet groove 125a forming a part of the gas bearing may be formed at one side of the front surface of the flange portion 122. A bearing communication hole 125b penetrating from the bearing inlet groove 125a to the inner circumferential surface of the body portion 121 may be formed. A gas groove 125c communicating with the bearing communication hole 125b may be formed on the inner circumferential surface of the body portion 121.

The bearing inlet groove 125a may be recessed in the axial direction to a predetermined depth. The bearing communication hole 125b is a hole having a smaller cross-sectional area than that of the bearing inlet groove 125a and may be inclined toward the inner circumferential surface of the body portion 121. The gas groove 125c may be formed in an annular shape having a predetermined depth and a predetermined axial length on the inner circumferential surface of the body portion 121. Unlike this, the gas groove 125c may be formed on the outer circumferential surface of the cylinder 140 with which the inner circumferential surface of the body portion 121 is in contact, or may be formed on both the inner circumferential surface of the body portion 121 and the outer circumferential surface of the cylinder 140.

In addition, a gas inlet port 142 corresponding to the gas groove 125c may be formed on the outer peripheral surface of the cylinder 140. The gas inlet port 142 forms a kind of nozzle in the gas bearing.

Meanwhile, the frame 120 and the cylinder 140 may be made of aluminum or aluminum alloy.

The cylinder 140 may be formed in a cylindrical shape with both ends open. The piston 150 may be inserted through the rear end of the cylinder 140. The front end of the cylinder 140 may be closed through the discharge valve assembly 170. The compression space 103 surrounded by the cylinder 140, the front end (head portion, 151) of the piston 150, and the discharge valve assembly 170 may be defined. The volume of the compression space 103 increases when the piston 150 moves backward, and the volume of the compression space 103 decreases as the piston 150 moves forward. That is, the refrigerant introduced into the compression space 103 may be compressed while the piston 150 moves forward, and may be discharged through the discharge valve assembly 170.

The cylinder 140 may include a flange portion 141 formed by bending the front end outward. The flange portion 141 of the cylinder 140 may be coupled to the frame 120. For example, a flange groove corresponding to the flange portion 141 of the cylinder 140 may be formed at the front end of the frame 120, and the flange portion 141 of the cylinder 140 may be inserted into the flange groove and coupled through a mechanical coupling member.

Meanwhile, a gas bearing is provided which is capable of lubricating gas between the cylinder 140 and the piston 150 by supplying discharge gas at an interval between the outer circumferential surface of the piston 150 and the outer circumferential surface of the cylinder 140. The discharge gas between the cylinder 140 and the piston 150 provides lifting force to the piston 150 to reduce friction of the piston 150 against the cylinder 140.

For example, the gas inlet port 142 may be formed in the cylinder 140. The gas inlet port 142 communicates with the gas groove 125c formed on the inner circumferential surface of the body portion 121, passes through the cylinder 140 in the radial direction, and guides the compressed refrigerant flowing into the gas groove 125c between the inner circumferential surface of the cylinder 140 and the outer circumferential surface of the piston 150. Alternatively, considering the convenience of processing, the gas groove 125c may be formed on the outer circumferential surface of the cylinder 140.

The inlet of the gas inlet port 142 may be relatively wide, and the outlet of the gas inlet port 142 may be formed as a fine hole to serve as a nozzle. A filter (not shown) may be additionally provided at the inlet of the gas inlet port 142 so as to block the inflow of foreign substances. The filter may be a mesh filter made of a metal or may be formed by winding a member such as Cecil.

A plurality of gas inlet ports 142 may be formed independently, or an inlet may be formed as an annular groove and a plurality of outlets may be formed along the annular groove at regular intervals.

In addition, the gas inlet port 142 may be formed only on the front side with respect to the middle of the cylinder 140 in the axial direction, and may also be formed at the rear side considering the sagging of the piston 150.

The piston 150 is inserted into the opened end of the rear of the cylinder 140 and is provided to seal the rear side of the compression space 103.

The piston 150 includes a head portion 151 that partitions the compression space 103 in a disk shape, and a cylindrical guide portion 152 that extends rearward from the outer circumferential surface of the head portion 151. The head portion 151 is provided to be partially opened, and the guide portion 152 is empty inside. The front side is partially sealed by the head portion 151, and the rear side is opened and connected to the muffler unit 160. The head portion 151 may be provided as a separate member to be coupled to the guide portion 152, or the head portion 151 and the guide portion 152 may be integrally formed with each other.

A suction port 154 is formed in the head portion 151 of the piston 150. The suction port 154 is provided to communicate the suction space 102 with the compression space 103 inside the piston 150. For example, the refrigerant flowing from the receiving space 101 to the suction space 102 inside the piston 150 may pass through the suction port 154 and may be suctioned into the compression space 103 between the piston 150 and the cylinder 140.

The suction port 154 may extend in the axial direction of the piston 150. Alternatively, the suction port 154 may be formed to be inclined in the axial direction of the piston 150. For example, the suction port 154 may extend to be inclined in a direction away from the central axis toward the rear side of the piston 150.

The suction port 154 may have a circular opening and a constant inner diameter. Alternatively, the suction port 154 may be formed as a long hole whose opening extends in the radial direction of the head portion 151, and may be formed such that the inner diameter increases toward the rear side.

A plurality of suction ports 154 may be formed in the radial direction and/or the circumferential direction of the head portion 151.

In addition, a suction valve 155 for selectively opening or closing the suction port 154 may be mounted to the head portion 151 of the piston 150 adjacent to the compression space 103. The suction valve 155 may be operated by elastic deformation to open or close the suction port 154. That is, the suction valve 155 may be elastically deformed to open the suction port 154 by the pressure of the refrigerant flowing into the compression space 103 through the suction port 154.

Furthermore, the piston 150 is connected to a mover 135, and the mover 135 is reciprocated in the front-and-rear direction according to the movement of the piston 150. The inner stator 134 and the cylinder 140 may be positioned between the mover 135 and the piston 150. The mover 135 and the piston 150 may be connected to each other by a magnet frame 136 formed by bypassing the cylinder 140 and the inner stator 134 to the rear side.

The muffler unit 160 is coupled to the rear side of the piston 150 and is provided to attenuate noise generated during the process of suctioning the refrigerant into the piston 150. The refrigerant suctioned through the suction pipe 114 flows through the muffler unit 160 to the suction space 102 inside the piston 150.

The muffler unit 160 includes a suction muffler 161 communicating with the receiving space 101 of the casing 110, and an inner guide 162 connected to the front side of the suction muffler 161 and guiding the refrigerant to the suction port 154.

The suction muffler 161 may be located at the rear side of the piston 150, the rear opening of the suction muffler 161 may be disposed adjacent to the suction pipe 114, and the front end of the suction muffler 161 may be coupled to the rear of the piston 150. The suction muffler 161 has a passage formed in the axial direction to guide the refrigerant in the receiving space 101 to the suction space 102 inside the piston 150.

In this case, a plurality of noise spaces partitioned by baffles may be formed inside the suction muffler 161. For example, the suction muffler 161 may be formed by combining two or more members with each other. For example, while the second suction muffler is press-fitted to the first suction muffler, the plurality of noise spaces may be formed. The suction muffler 161 may be made of a plastic material considering weight or insulation.

The inner guide 162 may have a pipe shape in which one side communicates with the noise space of the suction muffler 161 and the other side is inserted deeply into the piston 150. The inner guide 162 may be formed in a cylindrical shape provided with the same inner diameter at both ends. However, in some cases, the inner diameter of the front end on the discharge side may be greater than the inner diameter of the rear end on the opposite side.

The suction muffler 161 and the inner guide 162 may be provided in various shapes, and the pressure of the refrigerant passing through the muffler unit 160 may be adjusted through the suction muffler 161 and the inner guide 162. The suction muffler 161 and the inner guide 162 may be integrally formed with each other.

The discharge valve assembly 170 may include a discharge valve 171, and a valve spring 172 provided at the front side of the discharge valve 171 to elastically support the discharge valve 171. The discharge valve assembly 170 may selectively discharge the refrigerant compressed in the compression space 103. The compression space 103 may be understood as a space defined between the suction valve 155 and the discharge valve 171.

The discharge valve 171 may be supported to the front surface of the cylinder 140 and may be mounted to selectively open or close the front opening of the cylinder 140. The discharge valve 171 may be operated by elastic deformation to open or close the compression space 103. The discharge valve 171 may be elastically deformed to open the compression space 103 by the pressure of the refrigerant flowing into the discharge space 104 through the compression space 103. For example, when the discharge valve 171 is supported to the front surface of the cylinder 140, the compression space 103 may be maintained in a closed state. The compressed refrigerant in the compression space 103 may be discharged to the opened space in a state in which the discharge valve 171 is spaced apart from the front surface of the cylinder 140.

The valve spring 172 is provided between the discharge valve 171 and the discharge cover assembly 180 to provide elastic force in the axial direction. The valve spring 172 may be provided as a compression coil spring, or may be provided as a leaf spring considering the occupied space or reliability.

When the pressure of the compression space 103 is higher than the discharge pressure, the valve spring 172 is deformed forward to open the discharge valve 171, and the refrigerant is discharged from the compression space 103 and discharged to the first discharge space 103*a* of the discharge cover assembly 180. When the discharge of the refrigerant is completed, the valve spring 172 provides restoring force to the discharge valve 171 such that the discharge valve 171 is closed.

A process in which the refrigerant flows into the compression space 103 through the suction valve 155 and the refrigerant in the compression space 103 is discharged to the discharge space 104 through the discharge valve 171 will be described as follows.

In the process in which the piston 150 is linearly reciprocated within the cylinder 140, when the pressure of the compression space 103 is less than a predetermined suction pressure, the suction valve 155 is opened and the refrigerant is suctioned into the compression space 103. Meanwhile, when the pressure of the compression space 103 exceeds the predetermined suction pressure, the refrigerant in the compression space 103 is compressed in a state in which the suction valve 155 is closed.

On the other hand, when the pressure of the compression space 103 is greater than or equal to the predetermined discharge pressure, the valve spring 172 is deformed forward to open the discharge valve 171 connected thereto, and the refrigerant is discharged from the compression space 103 to the discharge space 104 of the discharge cover assembly 180. When the discharge of the refrigerant is completed, the valve spring 172 provides restoring force to the discharge valve 171, and the discharge valve 171 is closed to seal the front side of the compression space 103.

The discharge cover assembly 180 is installed in front of the compression space 103 to define the discharge space 104 to receive the refrigerant discharged from the compression space 103 and is coupled to the front side of the frame 120 to reduce noise generated in the process of discharging the refrigerant from the compression space 103. The discharge cover assembly 180 may be coupled to the front side of the flange portion 122 of the frame 120 while receiving the discharge valve assembly 170. For example, the discharge cover assembly 180 may be coupled to the flange portion 122 through a mechanical coupling member.

A gasket 165 for heat insulation and an O-ring 166 for preventing leakage of the refrigerant in the discharge space 104 may be provided between the discharge cover assembly 180 and the frame 120.

The discharge cover assembly 180 may be made of a thermally conductive material. Therefore, when a high-temperature refrigerant flows into the discharge cover assembly 180, heat of the refrigerant may be transferred to the casing 110 through the discharge cover assembly 180 and dissipated to the outside of the compressor.

One discharge cover assembly 180 may be provided, or a plurality of discharge covers may be arranged to be sequentially communicated. When the plurality of discharge covers are provided, the discharge space 104 may include a plurality of space portions partitioned by each discharge cover. The plurality of space portions are arranged in the front-and-rear direction and communicate with each other.

For example, when three discharge covers are provided, the discharge space 104 may include a first discharge space 103*a* defined between the frame 120 and the first discharge cover 181 coupled to the front side of the frame 120, a second discharge space 103*b* communicating with the first discharge space 103*a* and defined between the first discharge cover 181 and the second discharge cover 182 coupled to the front side of the first discharge cover 181, and a third discharge space 103*c* communicating with the second discharge space 103*b* and defined between the second discharge cover 182 and the third discharge cover 183 coupled to the front side of the second discharge cover 182.

The first discharge space 103*a* may selectively communicate with the compression space 103 by the discharge valve 171, the second discharge space 103*b* may communicate with the first discharge space 103*a*, and the third discharge space 103*c* may communicate with the second discharge space 103*b*. Therefore, the refrigerant discharged from the compression space 103 sequentially passes through the first discharge space 103*a*, the second discharge space 103*b*, and the third discharge space 103*c* to thereby reduce discharge noise, and may be discharged to the outside of the casing 110 through the discharge pipe 115 and the loop pipe 115*a* communicating with the third discharge cover 183.

The driving unit 130 may include an outer stator 131 disposed between the shell 111 and the frame 120 to surround the body portion 121 of the frame 120, an inner stator 134 disposed between the outer stator 131 and the cylinder 140 to surround the cylinder 140, and a mover 135 disposed between the outer stator 131 and the inner stator 134

The outer stator 131 may be coupled to the rear side of the flange portion 122 of the frame 120, and the inner stator 134 may be coupled to the outer circumferential surface of the body portion 121 of the frame 120. The inner stator 134 may be spaced apart toward the outer stator 131, and the mover 135 may be disposed in a space between the outer stator 131 and the inner stator 134.

The outer stator 131 may include a winding coil mounted thereto, and the mover 135 may include a permanent magnet. The permanent magnet may include a single magnet having one pole, or may include a combination of a plurality of magnets having three poles.

The outer stator 131 includes a coil winding body 132 surrounding an axial direction in a circumferential direction and a stator core 133 stacked while surrounding the coil winding body 132. The coil winding body 132 may include a hollow cylindrical bobbin 132*a* and a coil 132*b* wound in the circumferential direction of the bobbin 132*a*. The cross-section of the coil 132*b* may be formed in a circular or polygonal shape. For example, the cross-section of the coil 132*b* may have a hexagonal shape. The stator core 133 may include a plurality of lamination sheets radially stacked, or may include a plurality of lamination blocks stacked in the circumferential direction.

The front side of the outer stator 131 may be supported to the flange portion 122 of the frame 120, and the rear side of the outer stator 131 may be supported to the stator cover 137. For example, the stator cover 137 may be provided in a hollow disk shape, the outer stator 131 may be supported to the front surface of the stator cover 137, and a resonance spring 190 may be supported to the rear surface of the stator cover 137.

The inner stator 134 may be configured by stacking a plurality of laminations on the outer circumferential surface of the body portion 121 of the frame 120 in the circumferential direction.

One side of the mover 135 may be coupled and supported to the magnet frame 136. The magnet frame 136 has an approximately cylindrical shape and is inserted into a space between the outer stator 131 and the inner stator 134. The magnet frame 136 is coupled to the rear side of the piston 150 and is provided to move together with the piston 150.

As an example, the rear end of the magnet frame 136 may be bent and extended radially inward to form a coupling portion 136a, and the coupling portion 136a may be coupled to the flange portion 153 formed at the rear side of the piston 150. The coupling portion 136a of the magnet frame 136 and the flange portion 153 of the piston 150 may be coupled through a mechanical coupling member.

Furthermore, a flange portion 161a formed at the front side of the suction muffler 161 may be disposed between the flange portion 153 of the piston 150 and the coupling portion 136a of the magnet frame 136. Therefore, the piston 150, the muffler unit 160, and the mover 135 may be linearly reciprocated together in a state of being integrally coupled to each other.

When current is applied to the driving unit 130, magnetic flux is formed in the winding coil, and electromagnetic force is generated by an interaction between magnetic flux formed in the winding coil of the outer stator 131 and magnetic flux formed by the permanent magnet of the mover 135, so that the mover 135 can move. At the same time as the axial reciprocating movement of the mover 135, the piston 150 connected to the magnet frame 136 is also reciprocated in the axial direction integrally with the mover 135.

Meanwhile, the driving unit 130 and the compression units 140 and 150 may be supported in the axial direction by the support springs 116 and 117 and the resonance spring 190.

A resonance spring 118 amplifies vibrations generated by the reciprocating motion of the mover 135 and the piston 150, thereby effectively compressing the refrigerant. Specifically, the resonance spring 118 may be adjusted to a frequency corresponding to the natural frequency of the piston 150, so that the piston 150 can perform resonance motion. In addition, the resonance spring 118 may cause a stable movement of the piston 150 to reduce vibration and noise generation.

The resonance spring 118 may be a coil spring extending in the axial direction. Both ends of the resonance spring 118 may be connected to a vibrating body and a fixing body, respectively. For example, one end of the resonance spring 118 may be connected to the magnet frame 136, and the other end of the resonance spring 118 may be connected to the back cover 123. Therefore, the resonance spring 118 may be elastically deformed between the vibrating body vibrating at one end and the fixing body fixed to the other end.

The natural frequency of the resonance spring 118 is designed to match the resonance frequencies of the mover 135 and the piston 150 when the compressor 100 is operated, so that the reciprocating motion of the piston 150 can be amplified. However, since the back cover 123 provided as the fixing body is elastically supported to the casing 110 through the first support spring 116, the back cover 123 may not be strictly fixed.

The resonance spring 118 may include a first resonance spring 118a supported to the rear side with respect to a spring supporter 119, and a second resonance spring 118b supported to the front side with respect to the spring supporter 119.

The spring supporter 119 may include a body portion 119a surrounding the suction muffler 161, a coupling portion 119b bent in the inner radial direction from the front side of the body portion 119a, and a support portion 119c bent in the outer radial direction from the rear side of the body portion 119a.

The front surface of the coupling portion 119b of the spring supporter 119 may be supported to the coupling portion 136a of the magnet frame 136. The inner diameter of the coupling portion 119b of the spring supporter 119 may be provided to surround the outer diameter of the suction muffler 161. For example, the coupling portion 119b of the spring supporter 119, the coupling portion 136a of the magnet frame 136, and the flange portion 153 of the piston 150 may be sequentially arranged and then integrally coupled through a mechanical member. At this time, as described above, the flange portion 161a of the suction muffler 161 may be disposed between the flange portion 153 of the piston 150 and the coupling portion 136a of the magnet frame 136 so as to be fixed together.

The first resonance spring 118a may be provided between the front surface of the back cover 123 and the rear surface of the spring supporter 119, and the second resonance spring 118b may be provided between the rear surface of the stator cover 137 and the front surface of the spring supporter 119.

A plurality of first and second resonance springs 118a and 118b may be disposed in the circumferential direction of the central axis. The first resonance spring 118a and the second resonance spring 118b may be disposed parallel to each other in the axial direction, or may be disposed alternately with each other. The first and second springs 118a and 118b may be disposed at regular intervals in the radial direction of the central axis. For example, three first springs 118a and three second springs 118b may be provided and may be disposed at intervals of 120° in the radial direction of the central axis.

Meanwhile, the compressor 100 may include a plurality of sealing members capable of increasing coupling force between the frame 120 and parts around the frame 120.

For example, the plurality of sealing members may include a discharge cover sealing member disposed at a portion where the frame 120 and the discharge cover assembly 180 are coupled, and inserted into an installation groove provided at the front end of the frame 120, and a cylinder sealing member provided at a portion where the frame 120 and the cylinder 140 are coupled, and inserted into an installation groove provided on the outer surface of the cylinder 140. The cylinder sealing member may prevent the refrigerant in the gas groove 125c formed between the inner circumferential surface of the frame 120 and the outer circumferential surface of the cylinder 140 from leaking to the outside, and may increase the coupling force between the frame 120 and the cylinder 140. The plurality of sealing members may further include an inner stator sealing member provided at a portion where the frame 120 and the inner stator 134 are coupled, and inserted into an installation groove provided on the outer surface of the frame 120. The sealing members may have a ring shape.

The operation of the linear compressor 100 described above is as follows.

First, when current is applied to the driving unit 130, a magnetic flux may be formed in the outer stator 131 by the current flowing through the coil 132b. The magnetic flux formed in the outer stator 131 may generate electromagnetic force, and the mover 135 including the permanent magnet may be linearly reciprocated by the generated electromagnetic force. The electromagnetic force may be alternately generated in a direction (forward direction) in which the piston 150 is directed toward a top dead center (TDC) during a compression stroke and in a direction (rearward direction) in which the piston 150 is directed toward a bottom dead center (BDC) during a suction stroke. That is, the driving unit 130 may generate repellent force, which is a force that pushes the mover 135 and the piston 150 in the moving direction.

The piston 150 linearly reciprocating within the cylinder 140 may repeatedly increase and decrease the volume of the compression space 103.

When the piston 150 moves in a direction (rear direction) in which the volume of the compression space 103 increases, the pressure of the compression space 103 decreases. Accordingly, the suction valve 155 mounted in the front side of the piston 150 is opened, and the refrigerant remaining in the suction space 102 may be suctioned into the compression space 103 along the suction port 154. The suction stroke proceeds until the piston 150 maximizes the volume of the compression space 103 and is located at the bottom dead center.

The piston 150 having reached the bottom dead center converts the motion direction and performs the compression stroke while moving in a direction (forward direction) in which the volume of the compression space 103 decreases. During the compression stroke, the pressure of the compression space 103 increases and the suctioned refrigerant is compressed. When the pressure of the compression space 103 reaches a set pressure, the discharge valve 171 is pushed by the pressure of the compression space 103 and is opened from the cylinder 140, and the refrigerant is discharged to the discharge space 104 through the spaced space. The compression stroke continues while the piston 150 moves to the top dead center where the volume of the compression space 103 is minimum.

As the suction stroke and the compression stroke of the piston 150 are repeated, the refrigerant flowing into the receiving space 101 of the compressor 100 through the suction pipe 114 is introduced into the suction space 102 of the piston 150 by sequentially passing through the suction guide 116a, the suction muffler 161, and the inner guide, and the refrigerant in the suction space 102 is introduced into the compression space 103 of the cylinder 140 during the suction stroke of the piston 150. A passage may be formed, through which the refrigerant in the compression space 103 is compressed and discharged to the discharge space 104 during the compression stroke of the piston 150, and is then discharged to the outside of the compressor 100 through the loop pipe 115a and the discharge pipe 115.

Figure 2:
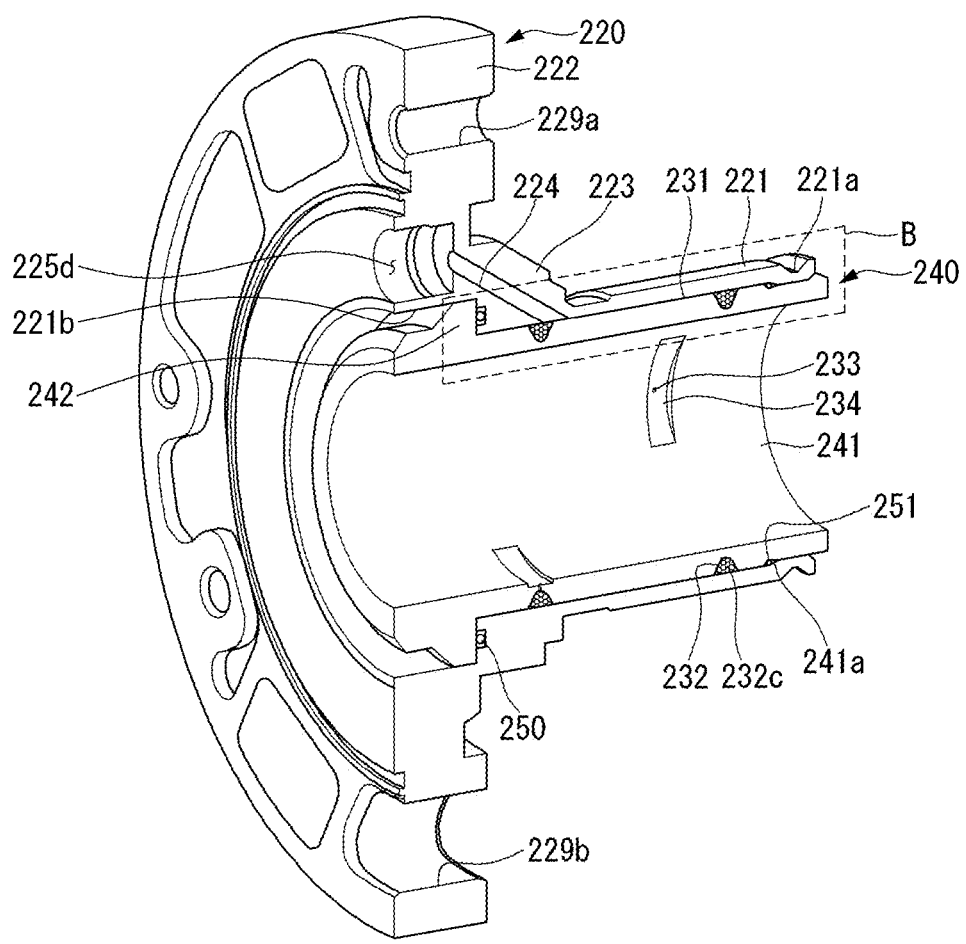
FIG. 2 is a perspective view showing a cross-section for explaining a coupling structure of a frame and a cylinder.
Figure 3:
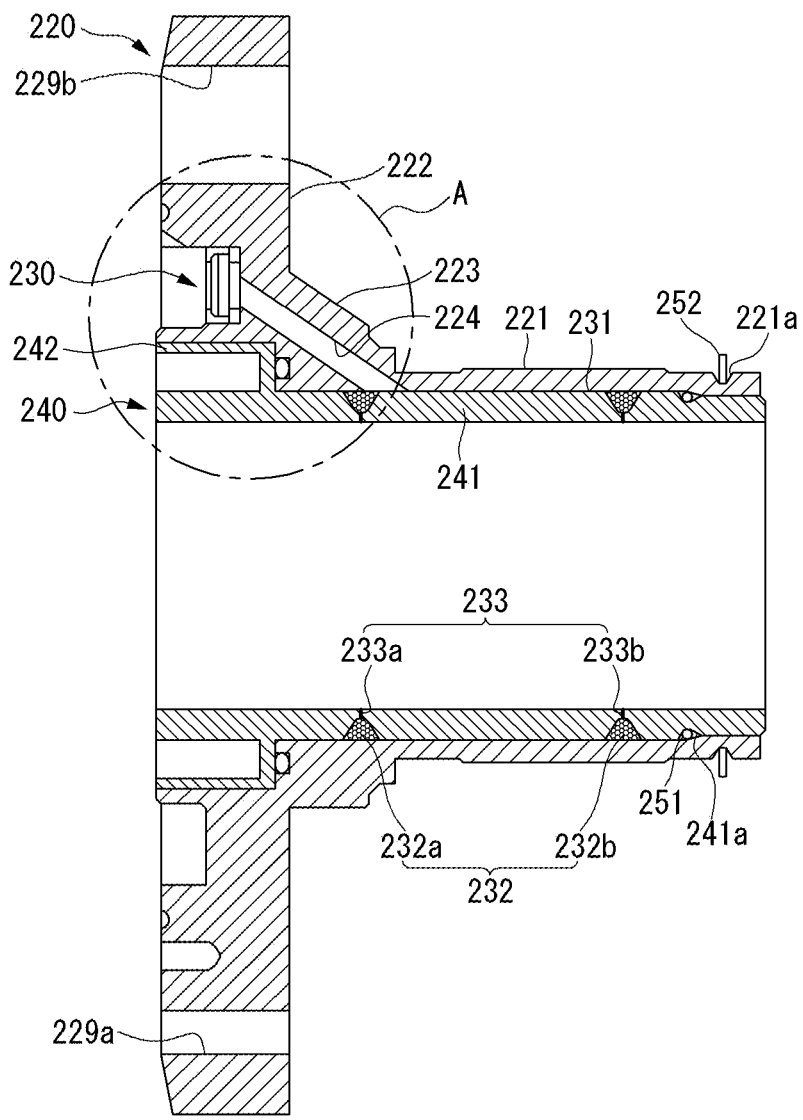
FIG. 3 is a side view of FIG. 2.
Figure 4:
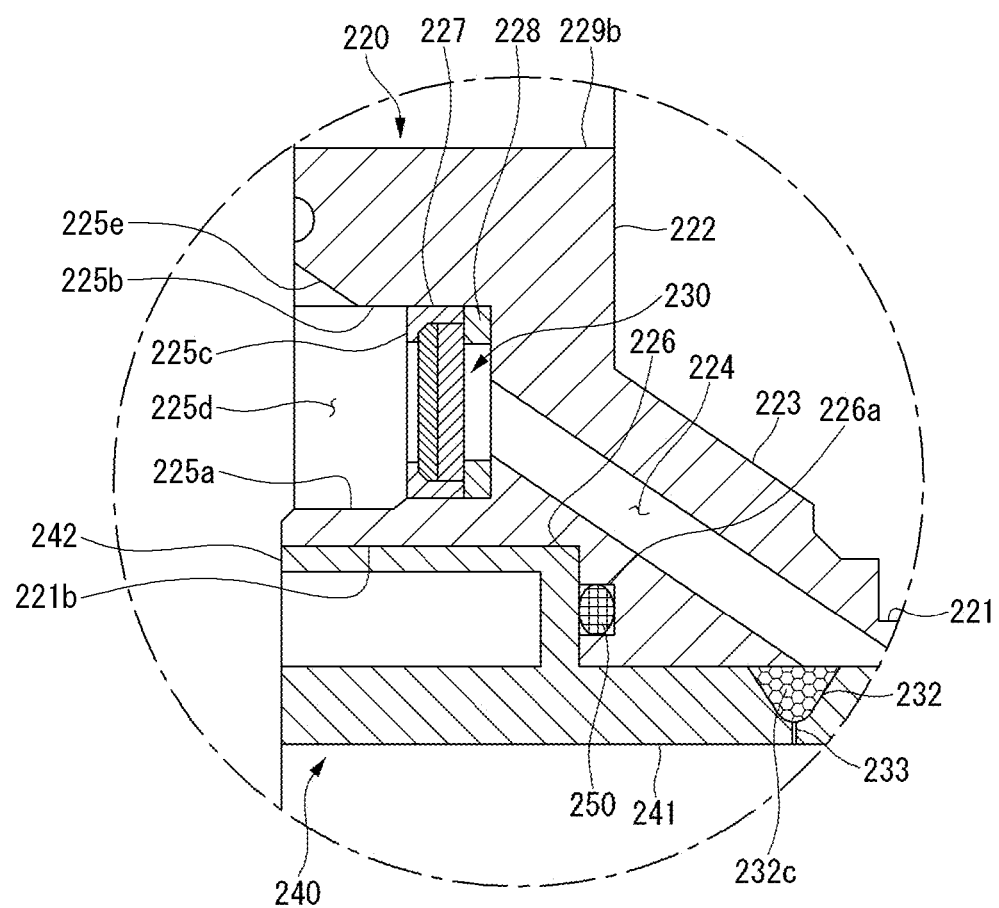
FIG. 4 is an enlarged view of a portion A in FIG. 3.

FIG. 2 is a perspective view showing a cross-section for explaining the coupling structure of the frame 220 and the cylinder 240, FIG. 3 is a side view of FIG. 2, and FIG. 4 is an enlarged view of a portion A in FIG. 3.

Referring to FIGS. 2 to 4, the cylinder 240 according to an embodiment may be coupled to the frame 220. For example, the cylinder 240 may be disposed to be inserted into the frame 220.

The frame 220 includes a frame body 221 extending in the axial direction and a frame flange 222 extending outward from the frame body 221 in the radial direction.

That is, the frame flange 222 may extend from the outer circumferential surface of the frame body 221 to form a first set angle. For example, the first set angle may be about 90°.

The frame body 221 may have a cylindrical shape having a central axis in the axial direction, and a body receiving portion for receiving a cylinder body 241 may be formed therein.

A third installation groove 221a into which a third sealing member 252 disposed between the frame body 221 and the inner stator 134 (see FIG. 1) is inserted may be defined in the rear side of the frame body 221.

The frame flange 222 includes a first wall 225a having a ring shape and coupled to the cylinder flange 242, a second wall 225b having a ring shape and disposed to surround the first wall 225a, and a third wall 225c connecting the rear end of the first wall 225a to the rear end of the second wall 225b. Each of the first wall 225a and the second wall 225b may extend in the axial direction, and the third wall 225c may extend in the radial direction.

A frame space portion 225d may be defined by the first to third walls 225a, 225b, and 225c. The frame space portion 225d is recessed backward from the front end of the frame flange 222 to form a part of the discharge passage through which the refrigerant discharged through the discharge valve 171 (see FIG. 1) flows.

A flange receiving portion into which at least a part of the cylinder 240, for example, the cylinder flange 242 is inserted is defined in an inner space of the first wall 225a. For example, the inner diameter of the flange receiving portion 221b may be formed to be equal to or slightly smaller than the outer diameter of the cylinder flange 242. When the cylinder 240 is press-fitted to the inside of the frame 220, the cylinder flange 242 may interfere with the first wall 225a. In this process, the cylinder flange 242 may be deformed.

The frame flange 222 further includes a sealing member seating portion 226 extending inward from the rear end of the first wall 225a in the radial direction. A first installation groove 226a into which the first sealing member 250 is inserted is defined in the sealing member seating portion 226. The first installation groove 226a may be recessed rearward from the sealing member seating portion 226.

The frame flange 222 further includes a coupling hole 229a to which a predetermined coupling member for coupling the frame 220 to peripheral parts is coupled. The coupling hole 229a may be provided in plurality along the outer circumference of the second wall 225a.

The frame flange 222 includes a terminal insertion portion 229b providing a withdrawing path of a terminal portion of the driving unit 130 (see FIG. 1). The terminal insertion portion 229b is formed such that the frame flange 222 is cut out in the front-and-rear direction.

The terminal portion may extend forward from the coil 132b (see FIG. 1) and may be inserted into the terminal insertion portion 229b. With this configuration, the terminal portion may be exposed to the outside from the driving unit 130 and the frame 220 and connected to a cable.

The terminal insertion portion 229b may be provided in plurality. The plurality of terminal insertion portions 119c may be disposed along the outer circumference of the second wall 225b. Only one terminal insertion portion 229b, into which the terminal portion is inserted, among the plurality of terminal insertion portions 229b is provided. The remaining terminal insertion portions 229b may be understood as elements for preventing the frame 220 from being deformed.

For example, three terminal insertion portions 229b may be provided in the frame flange 222. In the three terminal insertion portions, the terminal portion is inserted into one terminal insertion portion 229b, and the terminal portions are not inserted into the remaining two terminal insertion portions 229b.

The frame 220 is coupled to the stator cover 137 (see FIG. 1) or the discharge cover assembly 180 (see FIG. 1). In the process of press-fitting the frame 220 to the cylinder 240, a large amount of stress may act. When only one terminal insertion portion 229b is provided in the frame flange 222, the stress may be concentrated on a specific point to cause deformation of the frame flange 222. Therefore, in the present embodiment, the three terminal insertion portions 119c may be provided in the frame flange 222, that is, uniformly disposed in the circumferential direction with respect to the central portion of the frame 220 to prevent the stress from being concentrated.

The frame 220 further includes a frame inclined portion 223 inclinedly extending from the frame flange 222 to the frame body 221. The outer surface of the frame inclined portion 223 may extend to form a second set angle with respect to the outer circumferential surface of the frame body 221, that is, in the axial direction. For example, the second set angle may be greater than about 0° and less than about 90°.

A gas hole 224 for guiding the refrigerant discharged from the discharge valve 171 (see FIG. 1) to a gas inlet 232 of the cylinder 240 is defined in the frame inclined portion 223. The gas hole 224 may pass through the inside of the frame inclined portion 223.

In detail, the gas hole 224 may extend from the frame flange 222 up to the frame body 221 via the frame inclined portion 223.

Since the gas hole 224 is defined by passing through a part of the frame 220 having a relatively thick thickness up to the frame flange 222, the frame inclined portion 223, and the frame body 221, the strength of the frame 220 may be prevented from being reduced due to the formation of the gas hole 224.

The extension direction of the gas hole 224 may correspond to the extension direction of the frame inclined portion 223 to form the second set angle θ2 with respect to the inner circumferential surface of the frame body 221, that is, in the axial direction.

A discharge filter 230 for filtering foreign substances from the refrigerant introduced into the gas hole 224 may be disposed at the inlet of the gas hole 224. The discharge filter 230 may be installed on the third wall 225c.

In detail, the discharge filter 230 may be installed on a filter groove 227 defined in the frame flange 222. The filter groove 227 may be recessed rearward from the third wall 225c and have a shape corresponding to that of the discharge filter 230.

That is, the inlet of the gas hole 224 may be connected to the filter groove 227, and the gas hole 224 may pass through the frame flange 222 and the frame inclined portion 223 from the filter groove 227 to extend to the inner circumferential surface of the frame body 221. Therefore, the outlet of the gas hole 224 may communicate with the inner circumferential surface of the frame body 221.

In addition, a guide groove 225e for easily processing the gas hole 224 may be defined in the frame flange 222. The guide groove 225e may be formed by recessing at least a part of the second wall 225b and defined at the edge of the filter groove 227.

While the gas hole 224 is processed, a processing mechanism may be drilled from the filter groove 227 toward the frame inclined portion 223. The processing mechanism may interfere with the second wall 225b to cause a problem in which the drilling is not easy. Therefore, in the present embodiment, the guide groove 225e may be defined in the second wall 225b, and the processing mechanism may be disposed in the guide groove 225e so that the gas hole 224 is easily processed.

The linear compressor 10 further includes a filter sealing member 228 that is installed at the rear side of the discharge filter 230, that is, the outlet side. The filter sealing member 228 may have an approximately ring shape. In detail, the filter sealing member 228 may be placed on the filter groove 227. When the discharge filter 230 presses the filter groove 227, the filter sealing member 228 may be press-fitted to the filter groove 227.

Meanwhile, the frame inclined portion 223 may be provided in plurality along the circumference of the frame body 221. Only one frame inclined portion 223, in which the gas hole 224 is defined, among the plurality of frame inclined portions 223 is provided. The remaining frame inclined portions 223 may be understood as elements for preventing the frame 220 from being deformed.

When the frame 220 is coupled to the stator cover 149 or the discharge cover assembly 180, or when the frame is press-fitted to the cylinder 240, large stress may be applied to the frame 120. When only one frame inclined portion 223 is provided in the frame 220, the stress may be concentrated on a specific point to cause deformation of the frame 220. Therefore, in the present embodiment, three frame inclined portions 223 may be provided in outer side of the frame body 221, that is, uniformly disposed in the circumferential direction with respect to the central portion of the frame 220 to prevent the stress from being concentrated.

The cylinder 240 may be coupled to the inside of the frame 220. For example, the cylinder 240 may be coupled to the frame 220 through a press-fitting process.

The cylinder 240 includes a cylinder body 241 extending in the axial direction and a cylinder flange 242 disposed outside the front portion of the cylinder body 241. The cylinder body 241 has a cylindrical shape with a central axis in the axial direction and is inserted into the frame body 221. Therefore, the outer circumferential surface of the cylinder body 241 may be disposed to face the inner circumferential surface of the frame body 221.

The cylinder body 241 defines the gas inlet 232 through which the gas refrigerant flowing through the gas hole 224 is introduced.

The linear compressor 200 further includes a gas pocket 231 which is formed between the inner circumferential surface of the frame 220 and the outer circumferential surface of the cylinder 240 and through which gas for a lubrication function flows.

A refrigerant gas passage from the outlet of the gas hole 224 to the gas inlet 232 may define at least a part of the gas pocket 231. The gas inlet 232 may be disposed at the inlet side of a nozzle 233 that will be described later.

In detail, the gas inlet 232 may be recessed inward from the outer circumferential surface of the cylinder body 241 in the radial direction. The gas inlet 232 may have a circular shape along the outer circumferential surface of the cylinder body 241 with respect to the central axis in the axial direction.

The gas inlet 232 may be provided in plurality. For example, two gas inlets 232 may be provided. A first gas inlet 232a of the two gas inlets 232 is disposed on the front side of the cylinder body 241, that is, at a position that is close to the discharge valve 171 (see FIG. 1), and a second gas inlet 232b is disposed on the rear side of the cylinder body 241, that is, at a position that is close to the compressor suction side of the refrigerant. That is, the first gas inlet 232a may be disposed at the front side with respect to the central portion of the cylinder body 241 in the front-and-rear direction, and the second gas inlet 232b may be disposed at the rear side.

The first nozzle 233a connected to the first gas inlet 232a may be positioned at the front side with respect to the central portion, and the second nozzle 233b connected to the second gas inlet 232b may be positioned at the rear side with respect to the central portion.

In detail, the first gas inlet 232a or the first nozzle 233a is formed at a position spaced apart from the front end of the cylinder body 241 by a first distance. The second gas inlet 232b or the second nozzle 233b is formed at a position spaced apart from the front end of the cylinder body 241 by a second distance. The second distance may be greater than the first distance. A third distance from the front end of the cylinder body 241 to the central portion may be greater than the first distance and less than the second distance.

In addition, a fourth distance from the central portion to the first gas inlet 232a or the first nozzle 233a may be determined to be a value less than a fifth distance from the central portion to the second gas inlet 232b or the second nozzle 233b.

Meanwhile, the first gas inlet 232a is disposed at a position that is adjacent to the outlet of the gas hole 224. That is, a distance from the outlet of the gas hole 224 to the first gas inlet 232a may be less than a distance from the outlet to the second gas inlet 232b. For example, the outlet of the gas hole 224 and the first gas inlet 232a may be disposed to partially overlap each other.

An internal pressure of the cylinder 240 is relatively high at a position that is close to the discharge side of the refrigerant, that is, the inside of the first gas inlet 232a. Thus, the outlet of the gas hole 224 may be disposed adjacent to the first gas inlet 232a, so that a relatively large amount of refrigerant is introduced into the inside of the cylinder 240 through the first gas inlet 232a. As a result, the function of the gas bearing is reinforced to prevent abrasion of the cylinder 240 and the piston 150 during the reciprocating motion of the piston 150.

The cylinder body 241 further includes a nozzle 233 extending inward from the gas inlet 232 in the radial direction. The nozzle 233 may extend up to the inner circumferential surface of the cylinder body 241. For example, the inlet cross-sectional area of the nozzle 233 may be 0.2 square millimeters.

The radial length of the nozzle 233 is formed to be less than the radial length of the gas inlet 232, that is, the recessed depth. The size of the inner space of the nozzle 233 may be smaller than the size of the inner space of the gas inlet 232.

In detail, the recessed depth and width of the gas inlet 232 and the length of the nozzle 233 may be determined to be an appropriate size, considering the rigidity of the cylinder 240, the amount of the cylinder filter member 232c, or the magnitude of the pressure drop of the refrigerant passing through the nozzle 233.

For example, when the recessed depth and width of the gas inlet 232 are too large or the length of the nozzle 233 is too small, the rigidity of the cylinder 240 may be weakened. Meanwhile, when the recessed depth and width of the gas inlet 232 are too small, the amount of the cylinder filter member 232c that may be installed in the gas inlet 232 may be too small. When the length of the nozzle 233 is too large, the pressure drop of the refrigerant passing through the nozzle 233 becomes too large. Thus, it cannot perform a sufficient function as a gas bearing.

In the present embodiment, a ratio of the length of the nozzle 233 to the length of the gas inlet 232 is proposed in a range of 0.65 to 0.75. Within the above range of the ratio, the effect of the gas bearing is improved and the rigidity of the cylinder 240 can be maintained at a required level.

In addition, the diameter of the inlet of the nozzle 233 may be greater than the diameter of the outlet of the nozzle 233. Based on the flow direction of the refrigerant, the flow cross-sectional area of the nozzle 233 becomes smaller from the inlet to the outlet. The inlet may be understood as a portion connected to the gas inlet 232 to introduce the refrigerant into the nozzle 233, and the outlet may be understood as a portion connected to the inner circumferential surface of the cylinder 240 to supply the refrigerant to the outer circumferential surface of the piston 150.

In detail, when the diameter of the nozzle 233 is too large, the amount of the refrigerant flowing into the nozzle 233 among the high pressure gas refrigerants discharged through the discharge valve 171 becomes too large. Thus, the flow rate loss of the compressor is increased. Meanwhile, when the diameter of the nozzle 233 is too small, the pressure drop in the nozzle 233 becomes large and the performance as the gas bearing decreases.

Therefore, in the present embodiment, the diameter of the inlet of the nozzle 233 is formed to be relatively large to reduce the pressure drop of the refrigerant flowing into the nozzle 233, and the diameter of the outlet 123b is formed to be relatively small so that the amount of the gas bearing flowing through the nozzle 233 may be adjusted to a predetermined value or less.

For example, in the present embodiment, the ratio of the diameter of the inlet to the diameter of the outlet of the nozzle 233 is determined to be 4 to 5. Within this range of the ratio, an improvement in the effect of the gas bearing may be expected.

The nozzle 233 includes a first nozzle 233a extending from the first gas inlet 232a to the inner circumferential surface of the cylinder body 241, and a second nozzle 233b extending from the second gas inlet 232b to the inner circumferential surface of the cylinder body 241.

The refrigerant that is filtered by the cylinder filter member 232c while passing through the first gas inlet 232a is introduced into a space between the inner circumferential surface of the cylinder body 241 and the outer circumferential surface of the piston 150 through the first nozzle 233a. The refrigerant that is filtered by the cylinder filter member 232c while passing through the first gas inlet 232a is introduced into a space between the inner circumferential surface of the cylinder body 241 and the outer circumferential surface of the piston 150 through the second nozzle 233b.

The gas refrigerant flowing to the outer circumferential surface of the piston 150 through the first and second nozzles 233a and 233b may provide lifting force to the piston 150 to perform the function of the gas bearing with respect to the piston 150.

Since the first sealing member 250 seals the front space of the gas pocket 231, the refrigerant flowing through the gas pocket 231 may be prevented from leaking to the front side of the cylinder 240 and the frame 220. Since the second sealing member 251 seals the rear space of the gas pocket 231, the refrigerant flowing through the gas pocket 231 may be prevented from leaking to the rear side of the cylinder 240 and the frame 220. Therefore, the performance of the gas bearing may be improved.

A second installation groove 241a into which the third sealing member 252 disposed between the frame body 221 and the cylinder body 241 is inserted may be defined in the rear side of the frame body 221.

In the case of the embodiment of the present disclosure, gas bearing means may be used as described above. The gas bearing means may provide gas lubrication between the cylinder 240 and the piston 150 by supplying discharge gas at an interval of a distance between the outer circumferential surface of the piston 150 and the outer circumferential surface of the cylinder 240. The discharge gas between the cylinder 240 and the piston 150 provides lifting force to the piston 150 to reduce friction of the piston 150 against the cylinder 240.

Hereinafter, the space between the cylinder 240 and the piston 150, that is, the space filled with the discharge gas supplied for providing the lifting force, will be referred to as a sliding portion.

Figure 6:
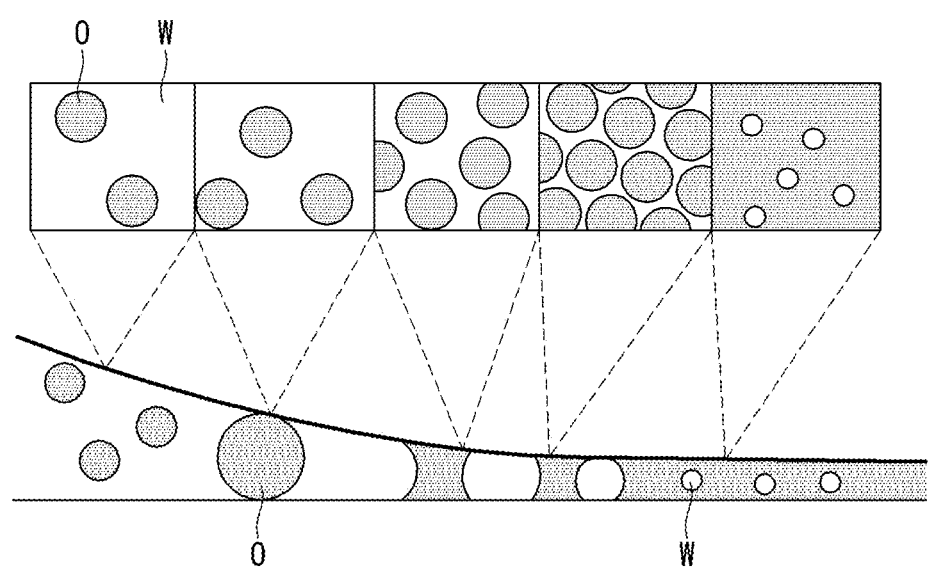
FIG. 6 is a schematic view for explaining the behavior of oil penetrating into a gap.

FIG. 5 is a view showing a phenomenon occurring when oil is introduced into a sliding portion, and FIG. 6 is a schematic view for explaining the behavior of oil penetrating into a gap.

When oil is introduced into the sliding portion, the lubricating performance of the discharged gas may decrease rapidly. This is because the introduced oil generates a high dynamic pressure in the sliding portion and acts as an airbag, thereby pushing the piston 150 to one side to generate contact with the inner wall of the cylinder 240. This may cause wear and tear of the piston 150.

In order to prevent the oil from being introduced into the sliding portion, a plurality of sealing members are installed in the coupling structure. However, in order to use the gas bearing means, the gas inlet 232 for introducing the refrigerant gas into the sliding portion is required, and it is necessary to prevent the oil from being introduced through the gas inlet 232.

The gas inlet 232 is mounted with the discharge filter 230 for blocking foreign substances, but it is difficult to filter the oil dissolved in the refrigerant due to the limitation in the specification of the discharge filter 230. This is because the refrigerant is suctioned in the gaseous state through the suction pipe, but the refrigerant may be phase-changed into the liquid state in partially high-temperature and low-temperature portions of the compressor 200, and the ambient oil may be dissolved in the phase-changed refrigerant. For example, even when the highest-spec discharge filter 230 is mounted, the oil dissolved in the r600a refrigerant cannot be filtered out.

The oil dissolved in the refrigerant may generate an oil lump between the frame 220 and the cylinder 240, and the generated oil may be introduced into the sliding portion, thus causing a problem. For reference, since oil has a very small surface tension as compared with water, a contact angle is very small when the oil touches a solid surface, so that it can easily pass through a relatively narrow gap.

Referring to (a) of FIG. 5, when oil O is generated in the lower part of the sliding portion, the oil O acts as the airbag during the compression stroke of the piston 150 to generate force for moving the front side of the piston 150 upward, and the upper front side of the piston 150 contacts or collides with the upper front side of the inner wall of the cylinder 240.

Referring to (b) of FIG. 5, when the oil O is generated in the upper part of the sliding portion, the oil O acts as the airbag during the suction stroke of the piston 150 to generate force for moving the rear side of the piston 150 downward, and the lower rear side of the piston 150 contacts or collides with the lower rear side of the inner wall of the cylinder 240.

Referring to FIG. 6, it can be seen that, when the moisture W is mixed with the oil O, the oil O may penetrate into a narrow gap. This is possible because the oil O has a very small surface tension as compared with the moisture w. Fine oil droplets O gather and grow around the narrow gap, and the oil droplets O with small surface tension are suctioned into the narrow gap due to the pressure difference. The penetrated oil O fills the narrow gap while the moisture W is contained in the state of fine droplets.

FIG. 4 shows a cylinder filter member 232c according to a comparative example.

Referring back to FIG. 4, the cylinder filter member 232c may be installed in the gas inlet 232. The cylinder filter member 232c may prevent foreign substances having a predetermined size or more from being introduced into the cylinder body 241 and may perform the function of adsorbing oil contained in the refrigerant. The predetermined size may be about 1 μm.

The cylinder filter member 232c may be the thread filter 232c provided in the shape of the thread wound around the gas inlet 232 30 times to 70 times with a constant tension. In detail, the thread filter 232c may be made of polyethylene terephthalate (PET) or polytetrafluoroethylene (PTFE) and may have a predetermined thickness or diameter.

The thread filter 232c serves as a filter to block fine dirt and oil contained in the refrigerant gas. In addition, the thread filter 232c also functions as a restrictor (flow restrictor) for reducing the pressure of the refrigerant gas introduced from the gas bearing system.

However, the thread filter 232c has several problems.

After the thread filter 232c is wound around the cylinder body 241, a part of the surface of the thread filter 232c is heat-sealed so that the thread filter 232c is fixed to the surface of the cylinder body 241. When the compressor 100 is coupled, or depending on the operating environment, as time elapses, the heat-sealed portion is damaged and the tension decreases. When the tension of the thread filter 232c decreases, not only the filter function but also the restrictor function may be weakened, and the performance of the gas bearing may deteriorate.

In addition, the thread filter 232c is fastened by winding the thread by applying tension to the gas inlet 232 grooved in the cylinder body 241. At this time, there is a possibility that deformation will occur in the cylinder body 241, and for this reason, the performance of the gas bearing may deteriorate.

The compressor includes the gas inlet 232 that is recessed radially inward from the outer circumferential surface of the cylinder body 241 and extends in the circular shape along the outer circumferential surface. The gas inlet 232 may communicate with the gas hole 224 and may receive lubricating gas through the gas hole 224.

The gas receiving groove 234 that is recessed to extend in the radial direction by a predetermined angle may be formed on the inner circumferential surface of the cylinder body 241. A plurality of gas receiving grooves 234 are provided in the circumferential direction, and the plurality of gas receiving grooves 234 may be disposed spaced apart from each other at equal intervals. For example, the gas receiving groove 234 may be recessed to extend in the circumferential direction by an angle of about 15° to 45°, and the three gas receiving grooves 234 may be disposed spaced apart from each other at equal intervals at an angle of 120° in the circumferential direction.

The gas receiving groove 234 positioned at the front side of the cylinder body 241 corresponding to the first gas inlet 232a and the gas receiving groove 234 located at the rear side of the cylinder body 241 corresponding to the second gas inlet 232b may be alternately disposed. For example, the gas receiving groove 234 positioned in the front side of the cylinder body 241 may be alternately disposed with the gas receiving groove 234 positioned in the rear side of the cylinder body 241 at an angle of 60°.

In addition, the gas receiving groove 234 positioned at the front side of the cylinder body 241 corresponding to the first gas inlet 232a and the gas receiving groove 234 located at the rear side of the cylinder body 241 corresponding to the second gas inlet 232b may be disposed not to overlap each other in a direction parallel to the axial direction.

The gas receiving groove 234 may be formed at a position opposite to the gas inlet 232. That is, the gas receiving groove 234 is disposed close to the gas inlet 232 and may be disposed on the inner surface of the circumference defined by the gas inlet 232.

The gas receiving groove 234 may communicate with the gas inlet 232 through the nozzle 233. For example, the nozzle 233 may define a hole passing through the center of the gas receiving groove 234 in the radial direction to communicate with the gas inlet 232.

The nozzle 233 is usually processed to a diameter of several tens of micrometers. However, during the repeated use period of the compressor, the oil that has penetrated into the gas inlet 232 is deposited in the nozzle 233, causing frequent clogging. As such, when oil is deposited on the nozzle 233, surface adhesive force is applied so that the oil cannot escape even by the pressure applied during the compression stroke of the piston 150.

The cylinder 240 may form the gas inlets 232 (232a, 232b) that are the passage through which the refrigerant gas provided from the gas hole 224 of the frame 220 passes. The gas inlet 232 may be a groove recessed on the outer circumferential surface of the cylinder 240 in the circumferential direction. The gas inlet 232 includes a first gas inlet 232a positioned in the front side of the cylinder 240 and a second gas inlet 232b positioned in the rear side of the cylinder 240.

The first gas inlet 232a and the second gas inlet 232b may communicate with each other through the gas pocket 231 defined between the cylinder 240 and the frame 220.

In addition, the cylinder 240 includes the nozzle 233 (233a, 233b) that passes through the gas inlet 232 in the radial direction, and the nozzle 233 may be provided in plurality in the circumferential direction of the gas inlet 232. A plurality of first nozzles 233a may be formed in the first gas inlet 232a, and a plurality of second nozzles 233b may be formed in the second gas inlet 232b.

In detail, the first gas inlet 232a and the first nozzle 233a are formed at positions spaced apart from the front end of the cylinder body 241 by a first distance, and the second gas inlet 232b and the second nozzle 233b are formed at positions spaced apart from the front end of the cylinder body 241 by a second distance greater than the first distance. A third distance from the front end of the cylinder body 241 to the central portion may be greater than the first distance and less than the second distance.

Meanwhile, the first gas inlet 232a is disposed at a position that is adjacent to the outlet of the gas hole 224. For example, the outlet of the gas hole 224 and the first gas inlet 232a may be disposed to partially overlap each other.

The internal pressure of the cylinder 240 is relatively high at a position that is close to the discharge side of the refrigerant, that is, the inside of the first gas inlet 232a. Thus, the outlet of the gas hole 224 may be disposed adjacent to the first gas inlet 232a, so that a relatively large amount of refrigerant is introduced into the inside of the cylinder 240 through the first gas inlet 232a. As a result, the function of the gas bearing is reinforced to prevent abrasion of the cylinder 240 and the piston 150 during the reciprocating motion of the piston 150.

In addition, the compressor 200 according to the embodiment of the present disclosure may prevent oil from being deposited in the nozzle 233 by forming the gas receiving groove 234. This is because, when the outlet of the nozzle 233 directly contacts the piston 150 or is very close to the piston 150, the probability of clogging is increased due to the accumulation of oil of the nozzle 233.

The depth of the gas receiving groove 234 may be continuously changed in the circumferential direction. For example, the recessed surface of the gas receiving groove 234 may have a greater curvature than that of the inner circumferential surface of the cylinder body 241. In this case, the nozzle 233 communicates with the deepest part of the gas receiving groove 234, and the space between the piston 150 and the nozzle 233 may be secured. As the depth of the gas receiving groove 234 is continuously reduced along the circumference of the piston 150, the refrigerant gas supplied through the nozzle 233 can be easily diffused between the piston 150 and the cylinder body 241.

In addition, the compressor 200 according to the embodiment of the present disclosure reduces the spacing of the gas pocket 231 acting as the passage of the refrigerant gas between the frame 220 and the cylinder 240, thereby preventing the movement of the penetrated oil and collecting the penetrated oil in the gas pocket 231. The gas pocket 231 may have a cylindrical strip shape formed in the space between the inner circumferential surface of the frame body 221 and the outer circumferential surface of the cylinder body 241, and both ends of the gas pocket 231 are sealed with sealing members 250 and 251. For example, the front end of the gas pocket 231 may be sealed with the first sealing member 250 and the rear end of the gas pocket 231 may be sealed with the second sealing member 251.

Generally, in the compressor using the gas bearing means, the spacing of the gas pockets 231 is about 150 micrometers. As such, the assembling process may be facilitated by placing a margin corresponding to an assembly tolerance.

In the embodiment of the present disclosure, the spacing of the gas pocket 231 may be in a range of 10 micrometers to 30 micrometers. That is, the gap (tolerance) between the inner circumferential surface of the frame body 221 and the outer circumferential surface of the cylinder 240 is provided in a range of 10 micrometers to 30 micrometers.

When the spacing of the gas pocket 231 is 30 micrometers or less, the oil is prevented from flowing into the gas inlet 232 due to the surface frictional force of the gas pocket 231. The surface frictional force of the oil increases as the spacing of the gas pocket 231 decreases. This is associated with the compression of the oil as the spacing of the gas pocket 231 decreases. That is, when the spacing of the gas pocket 231 is 30 micrometers, the frictional force of the oil and the stress applied to the oil are equal to each other, or the frictional force becomes larger.

In addition, the oil collected in the gap of the gas pocket 231 may be expected to serve as a filter for trapping foreign substances moving to the sliding portion.

When the spacing of the gas pocket 231 is 10 micrometers or more, the pressure drop in the gas inlet 232 satisfies the lubrication performance criterion at a level of 0.35 bar.

In this way, the structure that prevents oil from penetrating into the sliding portion by reducing the assembly tolerance between the cylinder 240 and the frame 220 is not adding specific parts or machining processing, thereby improving the reliability without increasing costs.

Hereinafter, the porous filter member 260 corresponding to the cylinder filter member 232c provided in the thread shape of FIG. 4 will be described.

Figure 7:
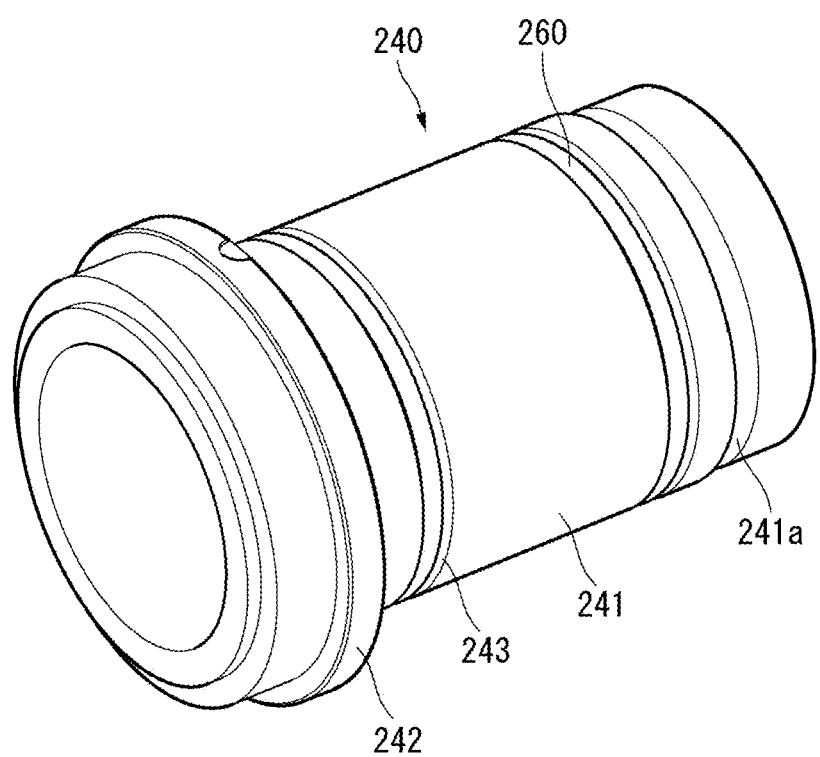
FIG. 7 is a perspective view showing a cylinder to which a cylinder filter member is coupled, according to a first embodiment of the present disclosure.
Figure 8:
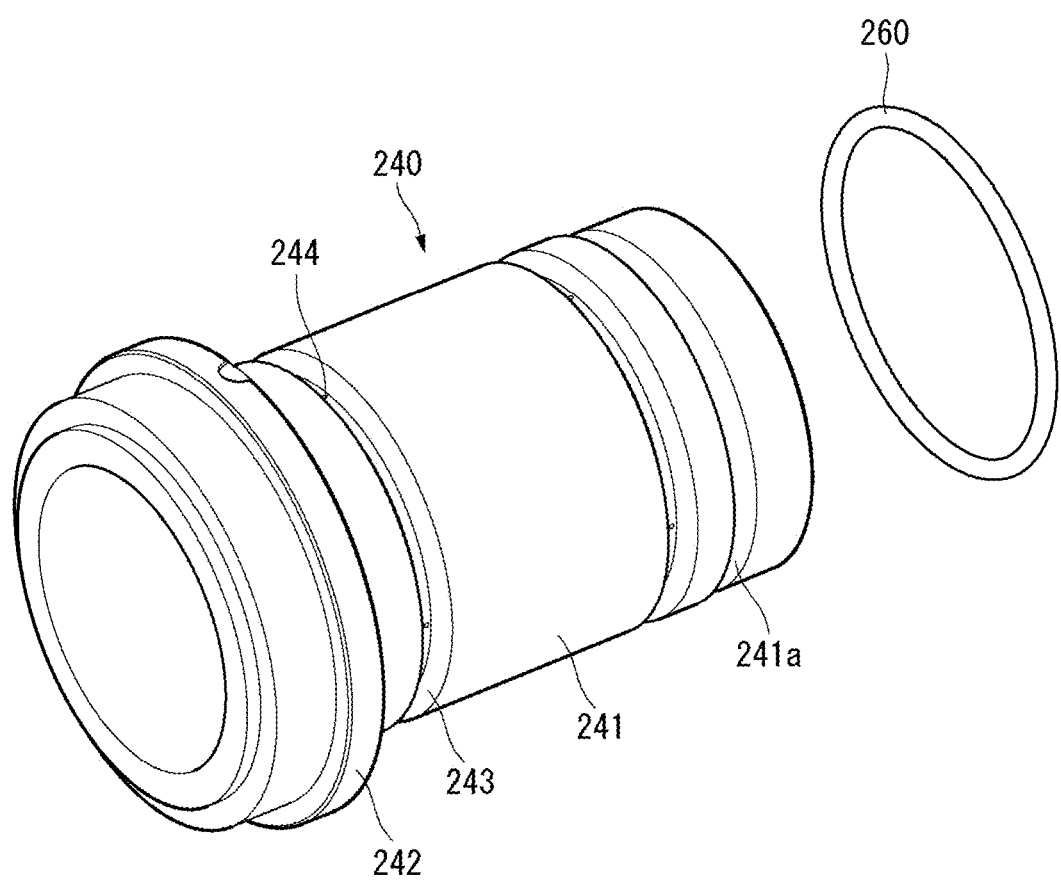
FIG. 8 is an exploded perspective view of FIG. 7.

FIG. 7 is a perspective view showing the cylinder to which the cylinder filter member 260 is coupled, according to a first embodiment of the present disclosure, and FIG. 8 is an exploded perspective view of FIG. 7.

Referring to FIGS. 7 and 8, the compressor according to the embodiment of the present disclosure may include a cylinder filter member 260 seated in a gas inlet 243 formed on an outer circumferential surface of a cylinder body 241 in a circumferential direction and surrounding the cylinder body 241.

The gas inlet 243 may be recessed from the outer circumferential surface of the cylinder body 241 in a radial direction. The gas inlet 243 may have a ring shape.

The cylinder filter member 260 may be provided in a ring shape integrally connected in a circumferential direction.

The cylinder filter member 260 may be elastically deformed. In detail, the cylinder filter member 260 may be elastically deformed in the radial direction so that the diameter thereof increases.

That is, when the inner diameter of the cylinder filter member 260 is less than the outer diameter of the cylinder body 241, it cannot be coupled to the outer circumferential surface of the cylinder body 241 before the cylinder filter member 260 is deformed, but it may be coupled to the cylinder body 241 when the cylinder filter member 260 is stretched and elastically deformed. When the cylinder filter member 260 is seated on the gas inlet 243, the shape may be partially restored.

At least a part of the cylinder filter member 260 may protrude radially outward from the outer circumferential surface of the cylinder body 241 in a state of being seated on the gas inlet 243. When the cylinder 240 and the frame 220 are coupled to each other, the cylinder filter member 260 may be pressed between the cylinder 240 and the frame 220 by the coupling force between the cylinder 240 and the frame 220, and thus, the shape of the cylinder filter member 260 may be deformed.

Figure 9:
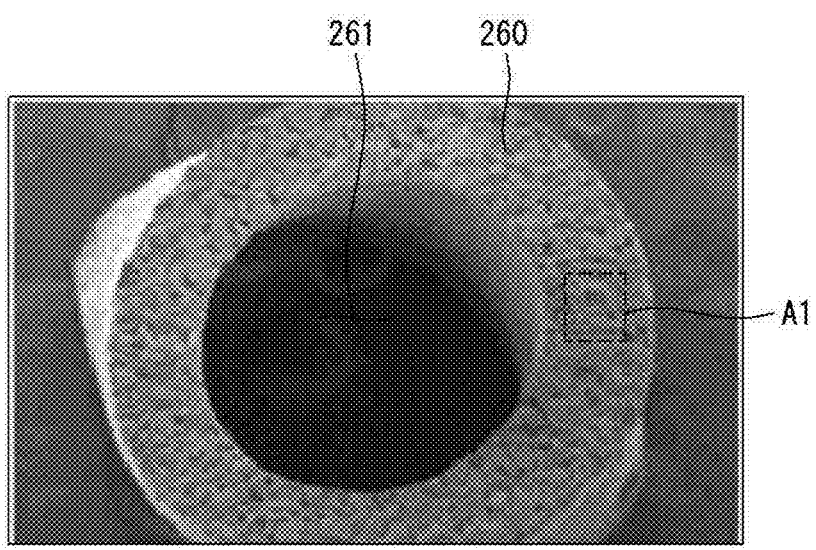
FIG. 9 is a photograph showing a cross-section of the cylinder filter member.
Figure 10:
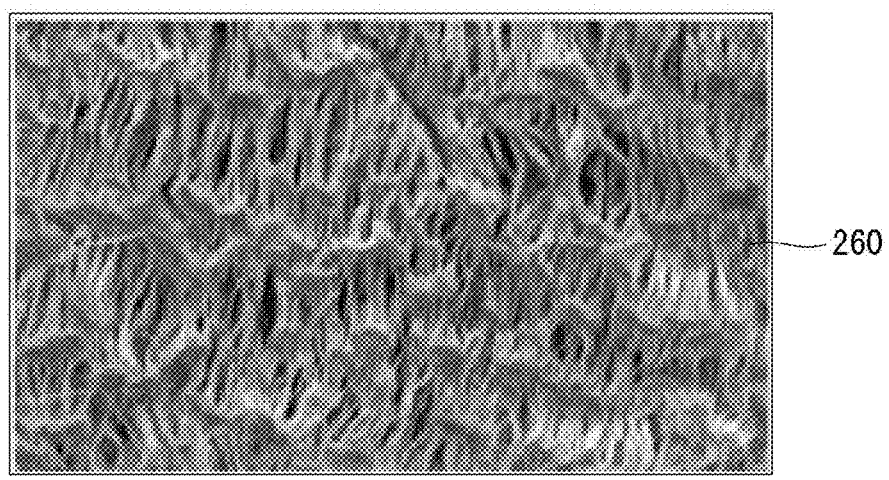
FIG. 10 is an enlarged photograph showing an area A1 of FIG. 9.

FIG. 9 is a photograph showing a cross-section of the cylinder filter member 260, and FIG. 10 is an enlarged photograph showing an area A1 of FIG. 9.

The cylinder filter member 260 may be provided as a porous filter member. That is, the cylinder filter member 260 includes a structure in which fine holes are continuously defined, and the refrigerant gas may flow through spaces defined by the fine holes. At this time, dirt or oil larger than the fine pores cannot escape the fine pores.

In other words, the size of the fine pores of the cylinder filter member 260 provided as the porous filter member may be larger than the size of the refrigerant gas and smaller than the size of the dirt or oil. For example, the fine pores may filter particles of 20 micrometers or more.

For example, the cylinder filter member 260 may include a porous polymer.

In detail, the cylinder filter member 260 may include any one of PTFE (polytetrafluoroethylene), ePTFE (expanded polytetrafluoroethylene), UHMWPE (Ultra High Molecular Weight Polyethylene), PE (polyethylene), PA (polyamide), PVDF (polyvinylidene fluoride), or PP (polypropylene). However, these are merely an example of the porous structure, and the cylinder filter member 260 may include porous structures other than those disclosed above.

In addition, the cylinder filter member 260 can be produced in an ultra-thin type, there is little risk of particle generation, and the filtration performance does not change even at high or low temperatures. Regardless of the type of refrigerant gas, the cylinder filter member 260 has chemical inactivity, low friction coefficient, and non-flammability.

In addition, the cylinder filter member 260 may be provided in a hollow tube or tube shape. That is, an inner passage 261 may be defined inside the cylinder filter member 260.

The inner passage 261 may be formed in a shape corresponding to the shape of the cylinder filter member 260. When the cylinder filter member 260 is provided in a tube shape, the inner passage 261 may be provided in a ring shape formed in the length direction (or extension direction) of the tube.

The inner passage 261 may communicate with the fine pores of the porous polymer. That is, the refrigerant gas flowing in or out of the fine holes may flow through the inner passage 261.

Figure 11:
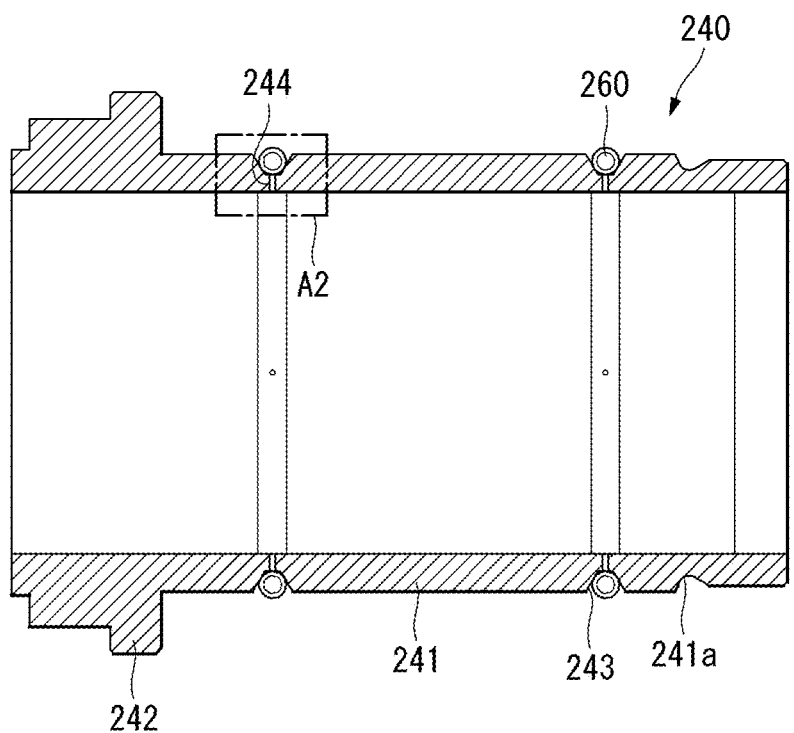
FIG. 11 is an axial cross-sectional view showing a cylinder according to an embodiment of the present disclosure.
Figure 12:
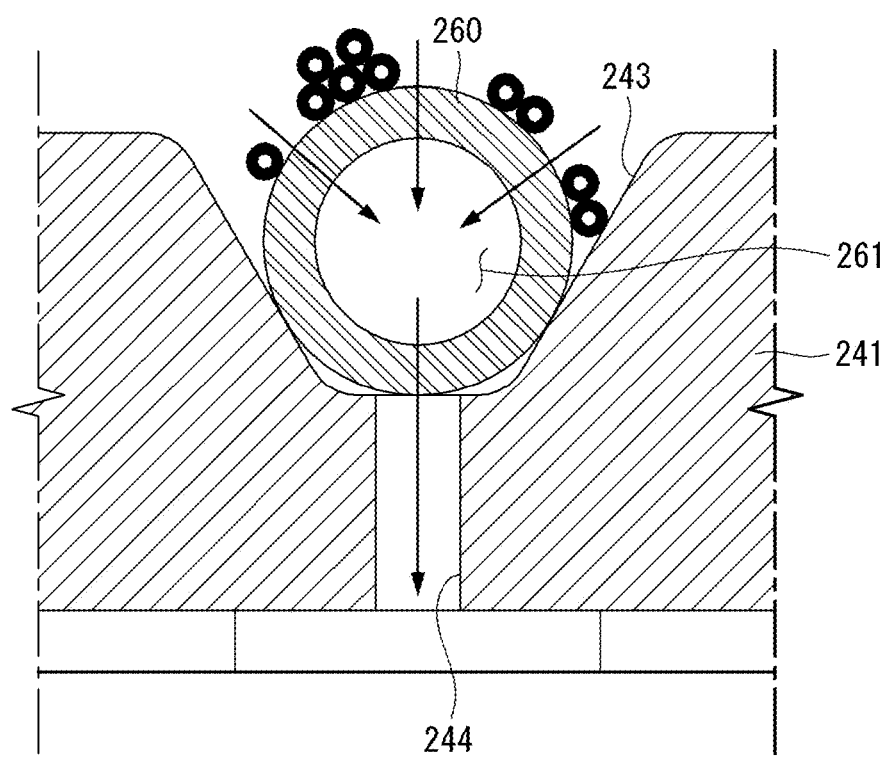
FIG. 12 is an enlarged view showing an area A2 of FIG. 11 so as to explain a state in which oil cannot penetrate.

FIG. 11 is an axial cross-sectional view showing the cylinder 240 according to an embodiment of the present disclosure, and FIG. 12 is an enlarged view showing an area A2 of FIG. 11 so as to explain a state in which oil cannot penetrate.

Referring to the drawings, the cylinder body 241 may include the gas pocket 231 (see FIG. 2) defined between the outer circumferential surface of the cylinder 240 and the inner circumferential surface of the frame 220, and the nozzle 244 communicating with the inside of the cylinder body 241. The nozzle 244 may be formed to pass through the cylinder body 241 in the radial direction.

The nozzle 244 may be connected to the gas inlet 243 that is recessed from the outer circumferential surface of the cylinder body 241. In detail, the gas inlet 243 may be connected to the inlet of the nozzle 244.

The cylinder filter member 260 may be inserted and seated in the gas inlet 243. At this time, the diameter of the cylinder filter member 260 may be greater than the diameter of the nozzle 244, and the cylinder filter member 260 seated on the gas inlet 243 may shield the inlet of the nozzle 244.

That is, since the inlet of the nozzle 244 communicating the gas pocket 231 (see FIG. 2) with the inside of the cylinder body 241 is clogged by the cylinder filter member 260, the refrigerant gas in the gas pocket 231 passes through the cylinder filter member 260 and flows to the nozzle 244.

In detail, the refrigerant gas may flow to the nozzle 244 through the fine hole of the cylinder filter member 260. At this time, dirt and oil that have moved together with the refrigerant gas are filtered by the cylinder filter member 260, and only pure refrigerant gas may flow to the nozzle 244.

Figure 13:
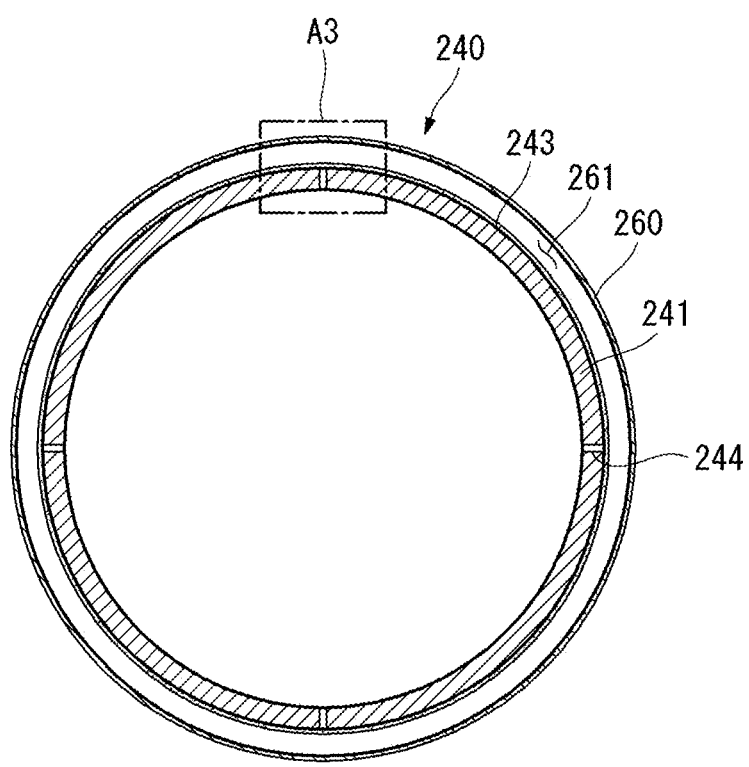
FIG. 13 is a radial cross-sectional view showing a cylinder according to an embodiment of the present disclosure.
Figure 14:
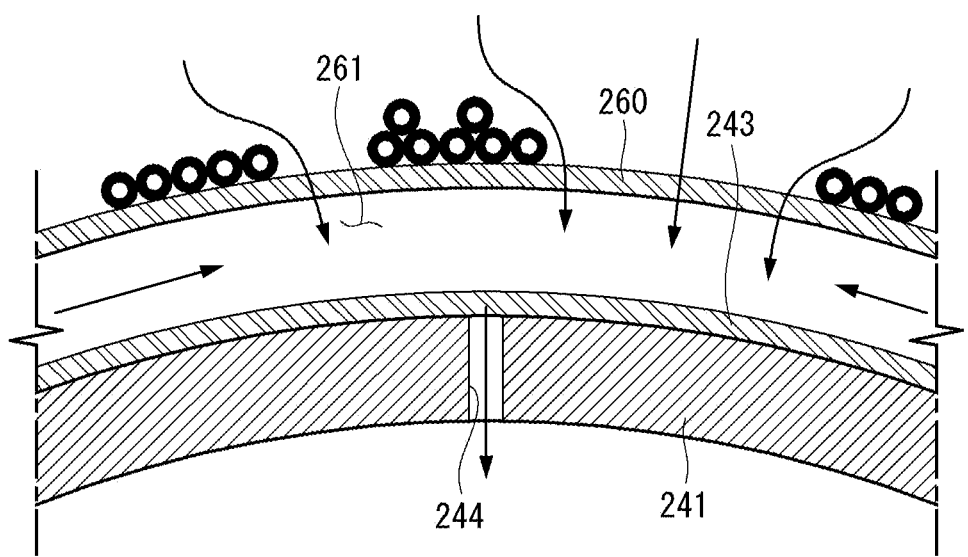
FIG. 14 is an enlarged view showing an area A3 of FIG. 13 so as to explain a state in which oil cannot penetrate.

FIG. 13 is a radial cross-sectional view showing the cylinder 240 according to an embodiment of the present disclosure, and FIG. 14 is an enlarged view showing an area A3 of FIG. 13 so as to explain a state in which oil cannot penetrate.

Referring to the drawings, a tube-shaped inner passage 261 may be defined inside the cylinder filter member 260. When the cylinder filter member 260 is used for a long time and dirt and oil accumulate on the outer surface to increase the fluid resistance, there is a concern that the flow rate of the refrigerant gas flowing through the fine holes of the cylinder filter member 260 may decrease.

However, since the refrigerant gas flows in a low resistance state through the inner passage 261 that is formed inside the cylinder filter member 260 and does not allow dirt or oil to flow in, the cylinder filter member 260 may have reliability for a long time.

Figure 15:
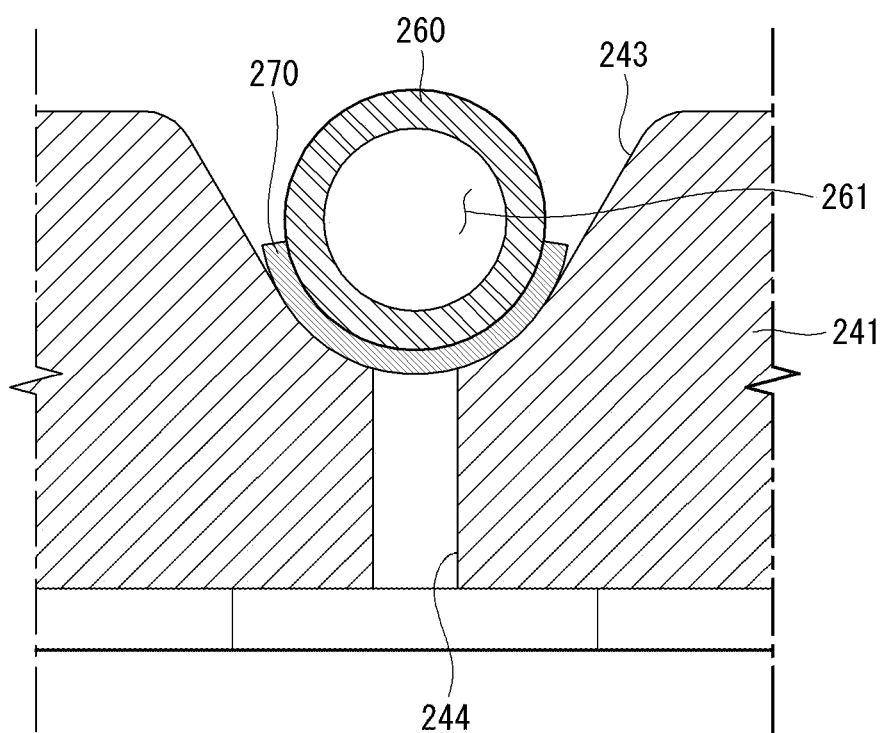
FIG. 15 is a cross-sectional view showing an embodiment of a method for coupling a cylinder filter member, according to the first embodiment.

FIG. 15 is a cross-sectional view showing an embodiment of a method for coupling a cylinder filter member 260, according to the first embodiment.

Referring to FIG. 15, the cylinder filter member 260 may be attached to the gas inlet 243 by medium of a thermosetting resin 270. In detail, the cylinder filter member 260 may be attached to the inner surface of the groove-shaped gas inlet 243 by medium of the thermosetting resin 270.

Since the cylinder body 241 is exposed to the high-temperature environment, an adhesive used to fix the cylinder filter member 260 is required to be resistant to heat.

The thermosetting resin 270 provided in the gas inlet 243 may be disposed in the inlet of the nozzle 244 and in the gas inlet 243 positioned around the inlet of the nozzle 244.

As another example, unlike those shown in FIG. 15, the thermosetting resin 270 may be provided so as not to block the inlet of the nozzle 244. That is, the cylinder filter member 260 may be bonded to the inner surface of the gas inlet 243 in a region other than the region in which the inlet of the nozzle 244 is provided.

Figure 16:
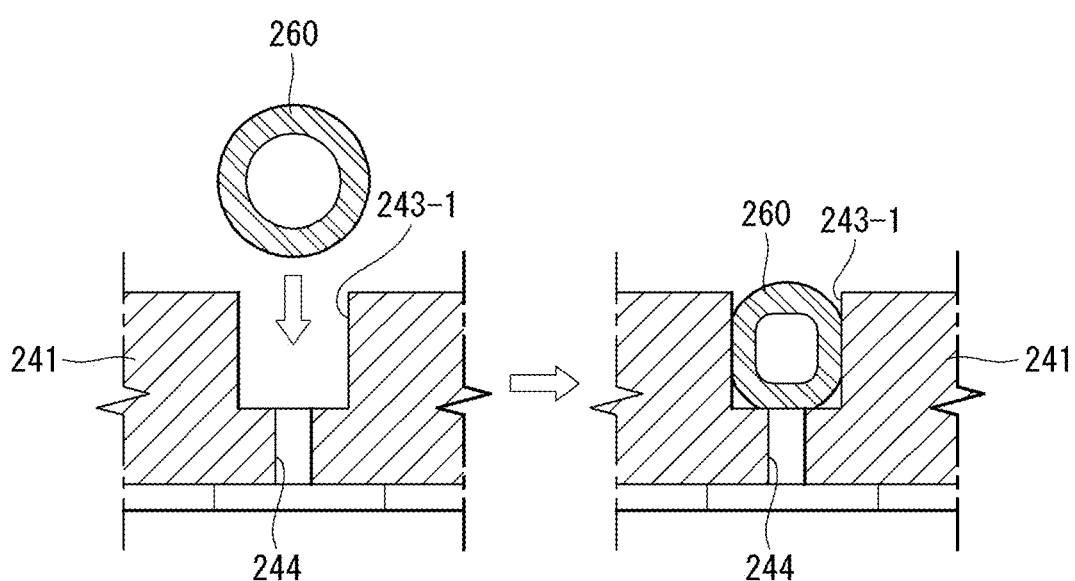
FIG. 16 is a cross-sectional view showing a modification of a method for coupling a cylinder filter member, according to the first embodiment.

FIG. 16 is a cross-sectional view showing a modification of a method for coupling a cylinder filter member 260, according to the first embodiment.

Referring to FIG. 16, a cylinder filter member 260 may be press-fitted to a gas inlet 243-1.

For example, the gas inlet 243-1 may have a polygonal cross section. The cylinder filter member 260 may have a circular cross-section, and the diameter of the cylinder filter member 260 may be greater than the width of the gas inlet 243-1.

That is, the cylinder filter member 260 may be provided to be elastically deformed, and may be press-fitted to the gas inlet 243-1. In this case, force acting as the shape of the cylinder filter member 260 is restored generates friction force on the inner wall of the gas inlet 243-1, thereby preventing the cylinder filter member 260 from being separated.

For example, the cross-section of the gas inlet 243-1 may have a rectangular shape.

Figure 17:
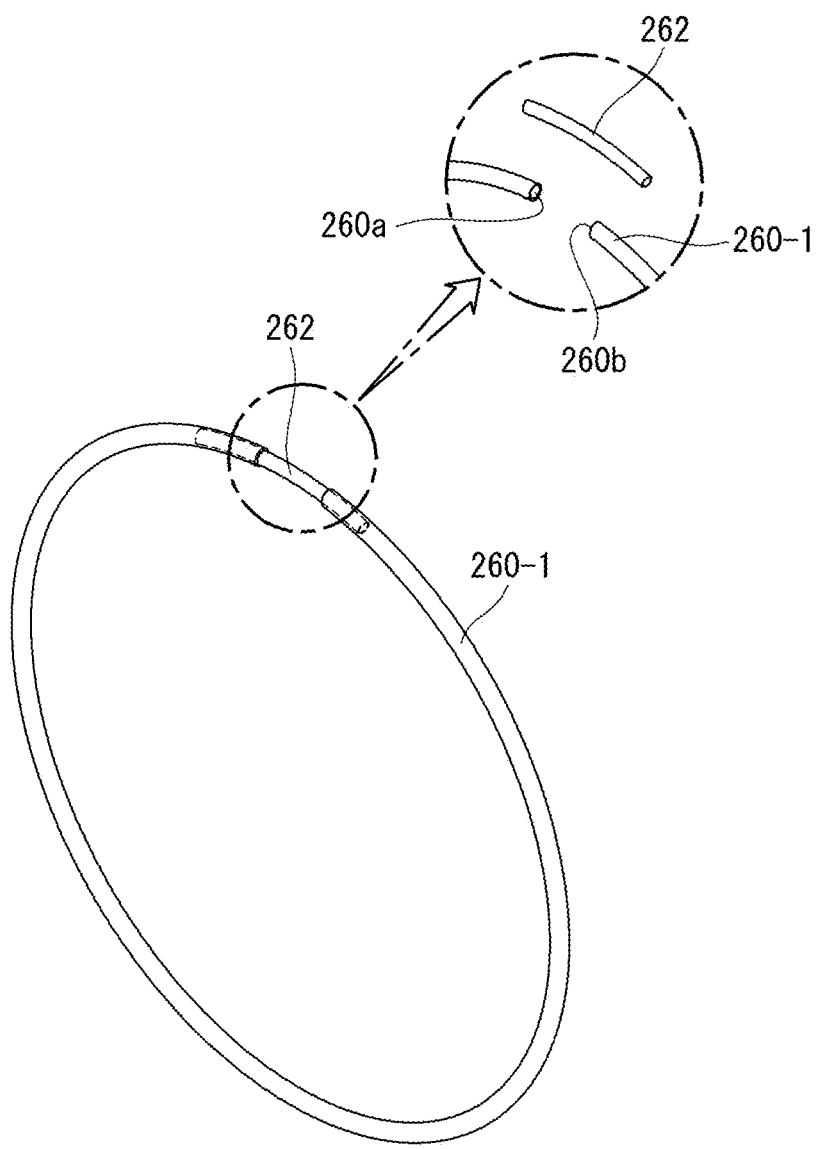
FIG. 17 is a perspective view showing a cylinder filter member according to a second embodiment.

FIG. 17 is a perspective view showing a cylinder filter member 260-1 according to a second embodiment.

The cylinder filter member 260-1 according to the second embodiment is provided to surround a cylinder body 241, but is provided to include a cut-out portion.

The cylinder filter member 260-1 may have a ring shape with a partially cut-out portion.

In addition, the cut-out portion of the cylinder filter member 260-1 may be connected by a connection member 262.

The connection member 262 may be provided so that both ends thereof may be fitted to the cylinder filter member 260-1. That is, both ends of the connection member 262 may be inserted into the inner passage 261 of the cylinder filter member 260-1.

The coupling of the connection member 262 and the cylinder filter member 260-1 includes press fitting or groove and protrusion coupling.

The connection member 262 may seal the inner passage 261 that is opened due to the cut-out portion of the cylinder filter member 260-1, so that foreign substances or the like do not flow into the inner passage 261. That is, even when the cylinder filter member 260-1 is formed with the cut-out portion, the connection member 262 may prevent foreign substances from flowing into the inner passage 261 through the cut-out portion.

For example, one end of the connection member 262 may be press-fitted to one cut end 260a of the cylinder filter member 260-1, and the other end of the connection member 262 may be press-fitted to the other cut end 260b of the cylinder filter member 260-1.

In addition, the curvature of the connection member 262 may correspond to the curvature of the gas inlet 243.

Figure 18:
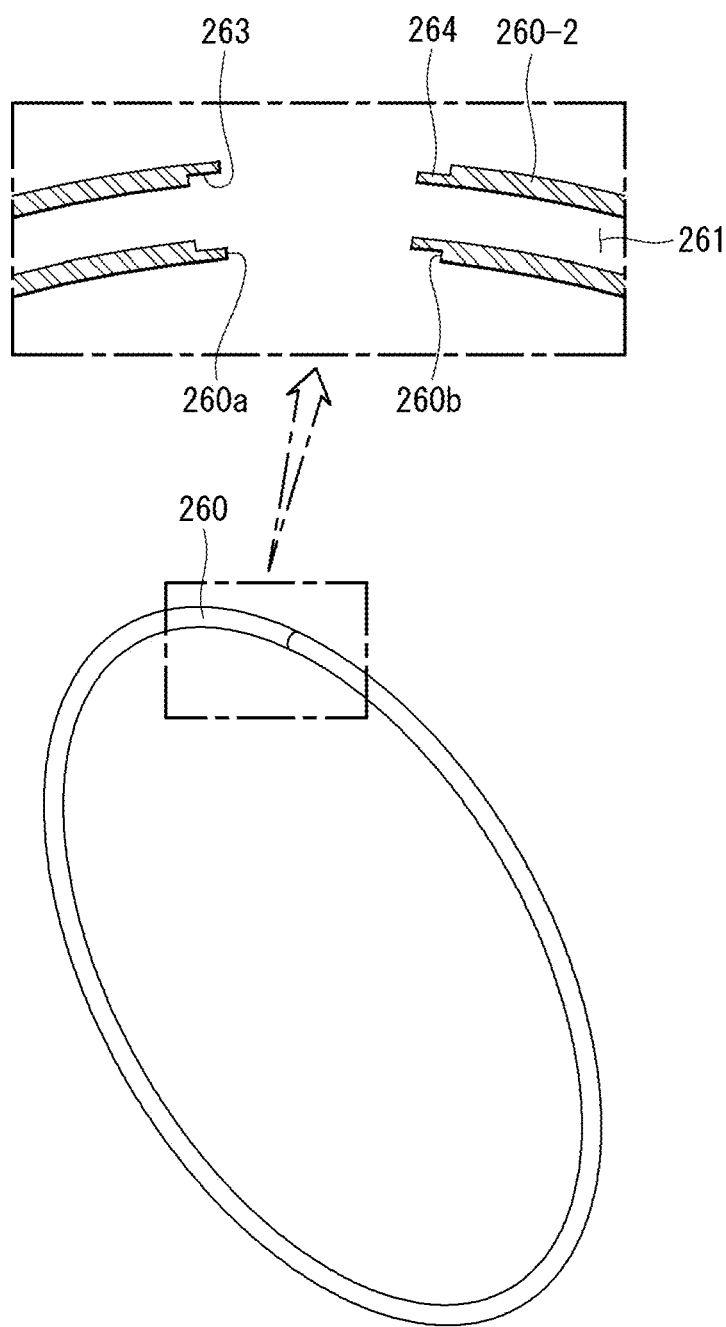
FIG. 18 is a perspective view showing a cylinder filter member according to a third embodiment.

FIG. 18 is a perspective view showing a cylinder filter member 260-2 according to a third embodiment.

The cylinder filter member 260-2 according to the third embodiment is provided to surround a cylinder body 241, but is provided to include a cut-out portion.

The cut-out portion of the cylinder filter member 260-2 is provided so that both ends thereof are coupled to each other.

For example, a coupling protrusion 264 may protrude from one end 260b of the cylinder filter member 260-2, and a coupling groove 263 into which the coupling protrusion 264 is inserted may be provided at the other end 260a of the cylinder filter member 260-2. Since the coupling protrusion 264 is inserted into the inner side of the coupling groove 263, both ends of the cylinder filter member 260-2 are coupled to each other. Thus, the inner passage 261 is sealed from the outside, thereby preventing the inflow of foreign substances or the like.

Figure 19:
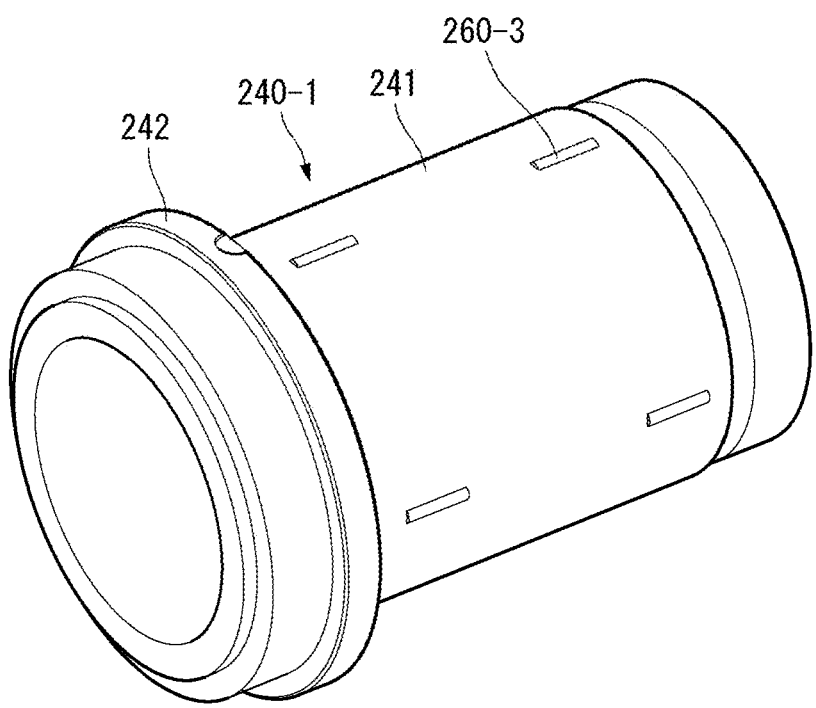
FIG. 19 is a perspective view showing a cylinder filter member according to a fourth embodiment.
Figure 20:
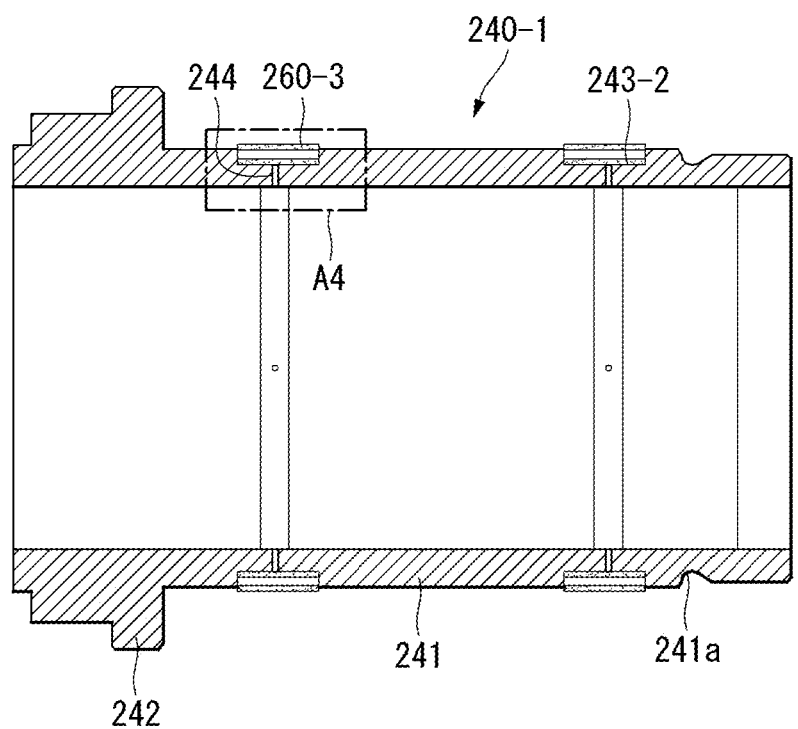
FIG. 20 is an axial cross-sectional view of FIG. 19.
Figure 21:
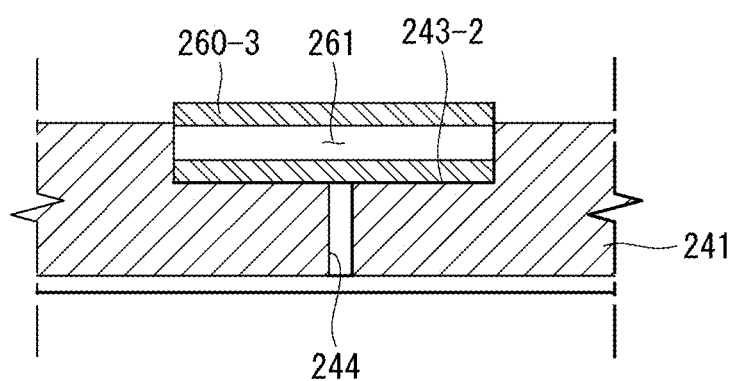
FIG. 21 is an enlarged view of an area A4 of FIG. 20.

FIG. 19 is a perspective view showing a cylinder filter member 260-3 according to a fourth embodiment, and FIG. 20 is an axial cross-sectional view of FIG. 19. FIG. 21 is an enlarged view of an area A4 of FIG. 20.

Referring to FIGS. 19 to 21, a compressor according to another embodiment of the present disclosure may include a gas inlet 243-2 extending in a longitudinal direction of a cylinder body 241 on the outer circumferential surface of the cylinder body 241, and a cylinder filter member 260-3 received in the gas inlet 243-2 and disposed in the longitudinal direction of the cylinder body 241

The gas inlet 243-2 may communicate with the inlet of the nozzle 244. The extension direction of the gas inlet 243-2 may intersect with the extension direction of the nozzle 244 passing through the cylinder body 241.

An axial cross-section of the gas inlet 243-2 may be formed in a rectangular shape.

The gas inlet 243-2 and the nozzle 244 formed therein may be provided at the front side and the rear side of the cylinder body 241, respectively. That is, the gas inlet 243-2 and the nozzle 244 provided in the front side of the cylinder body 241 may supply refrigerant gas of a gas pocket 231 to the front side of the inner space of the cylinder 240-1. and the gas inlet 243-2 and the nozzle 244 provided at the rear side of the cylinder body 241 may supply the refrigerant gas of the gas pocket 231 to the rear side of the inner space of the cylinder 240.

A plurality of gas inlets 243-2 may be formed along the circumferential direction of the cylinder body 241. The plurality of gas inlets 243-2 may be spaced apart from each other in the circumferential direction of the cylinder body 241.

Furthermore, as the plurality of gas inlets 243-2 are formed, a plurality of cylinder filter members 260-3 may be formed.

The cylinder filter member 260-3 may protrude outward from the outer circumferential surface of the cylinder body 241 in a state of being seated on the gas inlet 243-2. Therefore, when the cylinder 240-1 and the frame 220 are coupled to each other, the cylinder filter member 260-3 may be pressed between the cylinder 240-1 and the frame 220, and thus, the shape of the cylinder filter member 260-3 may be deformed.

In a state in which the cylinder 240-1 and the frame 220 are coupled to each other, an inner passage 261 of the cylinder filter member 260-3 may not be exposed to the outside of the gas inlet 243-2.

That is, the cylinder filter member 260-3 is press-fitted to the gas inlet 243-2 so that both ends of the cylinder filter member 260-3 may be in close contact with the inner wall of the gas inlet 243-2, and the inner passage 261 may be positioned radially inside the outer circumferential surface of the cylinder body 241.

In this way, since the inner passage 261 is not exposed to the outside of the cylinder 240-1, foreign substances may be prevented from entering.

Figure 22:
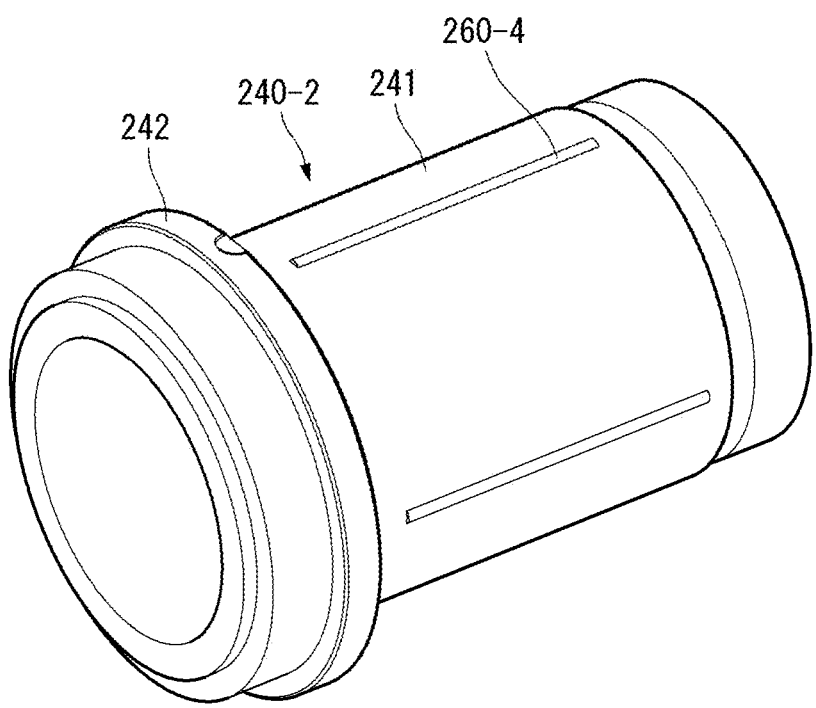
FIG. 22 is a perspective view showing a cylinder filter member according to a fifth embodiment.
Figure 23:
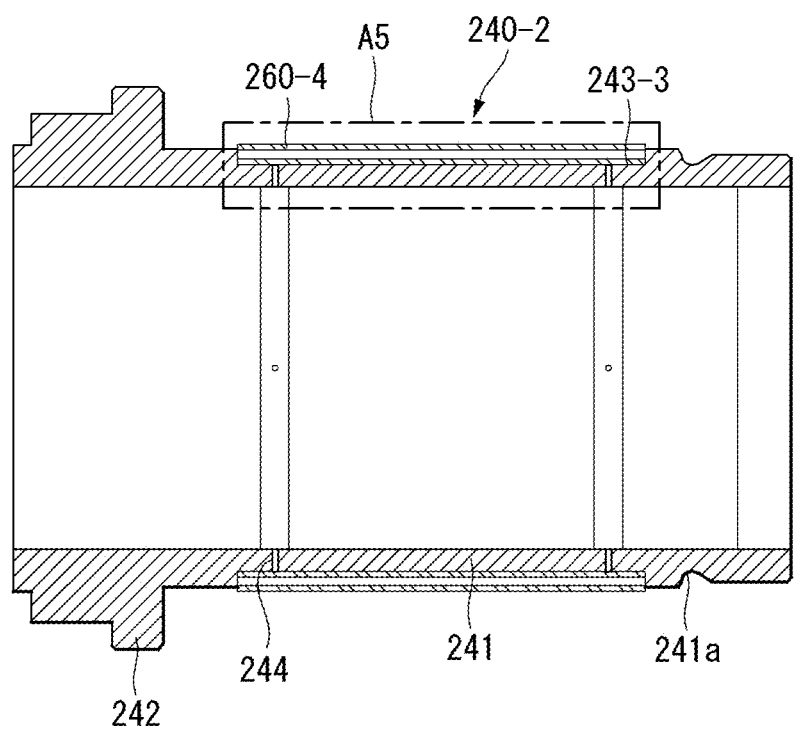
FIG. 23 is an axial cross-sectional view of FIG. 22.
Figure 24:
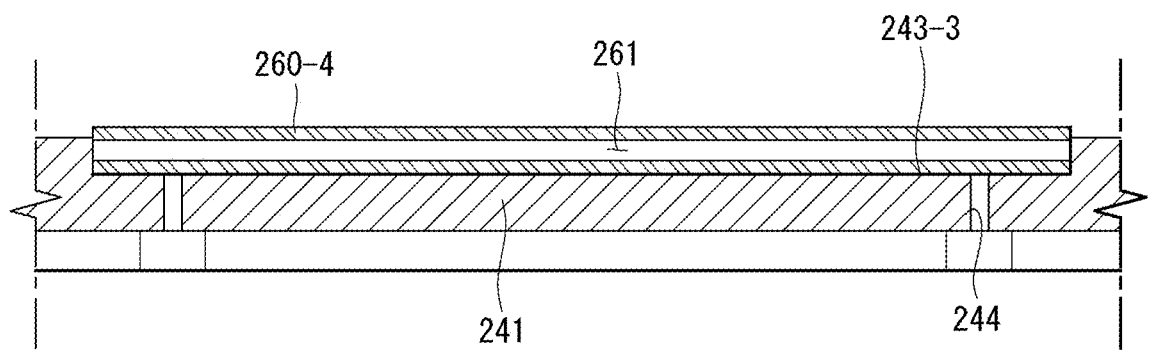
FIG. 24 is an enlarged view of an area A5 of FIG. 23.

FIG. 22 is a perspective view showing a cylinder filter member 260-4 according to a fifth embodiment, and FIG. 23 is an axial cross-sectional view of FIG. 22. FIG. 24 is an enlarged view of an area A5 of FIG. 23.

Referring to FIGS. 22 to 24, a compressor according to another embodiment of the present disclosure may include a gas inlet 243-3 extending in a longitudinal direction of a cylinder body 241 of a cylinder 240-2 on the outer circumferential surface of the cylinder body 241, and a cylinder filter member 260-4 received in a gas inlet 243-3 and disposed in the longitudinal direction of the cylinder body 241

The cylinder filter member 260-4 may be seated on the inner wall of the gas inlet 243-3. That is, the cylinder filter member 260-4 may be formed to a length so as to be received in the gas inlet 243-3.

Nozzles 244 communicating with the gas inlet 243-3 may be provided at the front side and the rear side of the cylinder body 241, respectively. The inlet of the nozzle 244 may communicate with the gas inlet 243-3, and the nozzle 244 may extend from the gas inlet 243-3 to the inner circumferential surface of the cylinder body 241.

The gas inlet 243-3 and the cylinder filter member 260-4 may extend in the longitudinal direction of the cylinder body 241 so as to cover the nozzle 244 positioned at the front side of the cylinder body 241 and the nozzle 244 positioned at the rear side of the cylinder body 241.

In other words, the axial length of the gas inlet 243-3 may be longer than the axial length from the nozzle 244 positioned in the front side of the cylinder body 241 to the nozzle 244 positioned in the rear side of the cylinder body 241.

The cylinder filter member 260-4 may protrude outward from the outer circumferential surface of the cylinder body 241 in a state of being seated on the gas inlet 243-3. Therefore, when the cylinder 240-2 and the frame 220 are coupled to each other, the cylinder filter member 260-4 may be pressed between the cylinder 240-2 and the frame 220, and thus, the shape of the cylinder filter member 260-4 may be deformed.

In a state in which the cylinder 240-2 and the frame 220 are coupled to each other, an inner passage 261 of the cylinder filter member 260-4 may not be exposed to the outside of the gas inlet 243-3.

That is, the cylinder filter member 260-4 is press-fitted to the gas inlet 243-3 so that both ends of the cylinder filter member 260-4 may be in close contact with the inner wall of the gas inlet 243-3, and the inner passage 261 may be positioned radially inside the outer circumferential surface of the cylinder body 241.

In this way, since the inner passage 261 is not exposed to the outside of the cylinder 240-2, foreign substances may be prevented from entering.

Figure 25:
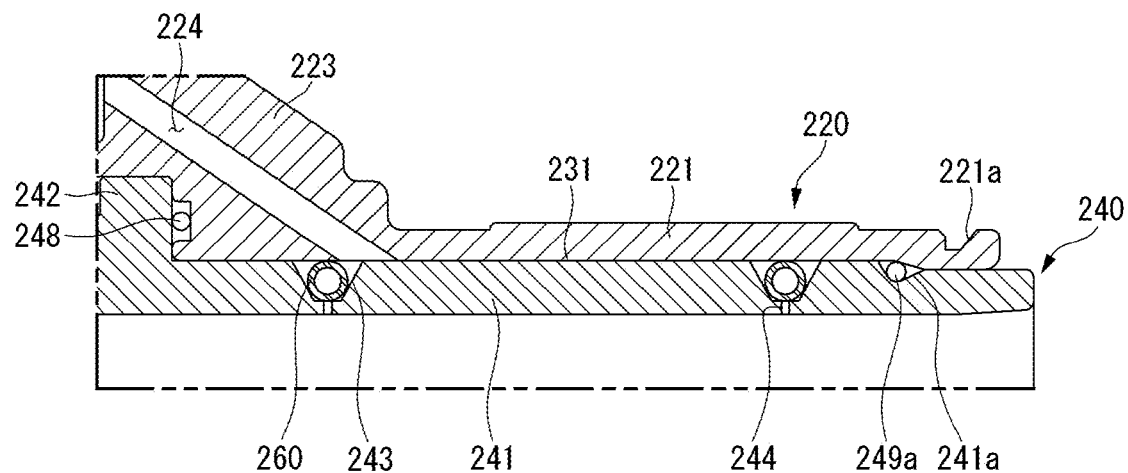
FIG. 25 is an enlarged cross-sectional view of portion B in FIG. 2.

FIG. 25 is an enlarged cross-sectional view of portion B in FIG. 2.

Referring to FIG. 25, the compressor according to the embodiment of the present disclosure includes a gas inlet 243 that is recessed radially inward from the outer circumferential surface of the cylinder body 241 and extends in the circular shape in the circumferential direction of the cylinder body 241. The gas inlet 243 may communicate with the gas hole 224 and may receive lubricating gas through the gas hole 224.

In detail, the gas hole 224 may communicate with the gas inlet 243 formed in the front side of the cylinder body 241.

The gas inlet 243 may include a front gas inlet formed at the front side of the cylinder body 241 and a rear gas inlet formed at the rear side of the cylinder body 241. One or more nozzles 244 may be formed at the front gas inlet and the rear gas inlet, respectively.

The nozzle 244 functions as a passage for communicating the gas pocket 231 with the inner space of the cylinder 240.

The nozzle 244 is usually processed to a diameter of several tens of micrometers. However, during the repeated use period of the compressor, the oil that has penetrated into the gas inlet 243 is deposited in the nozzle 244, causing frequent clogging. As such, when oil is deposited on the nozzle 244, surface adhesive force is applied so that the oil cannot escape even by the pressure applied during the compression stroke of the piston 150.

A cylinder filter member 260 is provided in the gas inlet 243 to filter refrigerant gas introduced into the nozzle 244.

The cylinder filter member 260 may include a front cylinder filter member 260 received in the front gas inlet 243 and a rear cylinder filter member 260 received in the rear gas inlet 243.

In addition, the cylinder filter member 260 may be in close contact with the inner wall of the gas inlet 243 while the shape of the cylinder filter member 260 is being deformed when the cylinder 240 and the frame 220 are coupled to each other. Therefore, a gap that may occur between the nozzle 244 and the cylinder filter member 260 seated on the gas inlet 243 may be blocked.

In addition, the compressor 200 according to the embodiment of the present disclosure reduces the spacing of the gas pocket 231 acting as the passage of the refrigerant gas between the frame 220 and the cylinder 240, thereby preventing the movement of the penetrated oil to the gas inlet 243 and collecting the penetrated oil in the gas pocket 231.

The gas pocket 231 may have a hollow cylindrical shape formed in the space between the inner circumferential surface of the frame body 221 and the outer circumferential surface of the cylinder body 241, and both ends of the gas pocket 231 are sealed with sealing members 250 and 251.

For example, the front end of the gas pocket 231 may be sealed with the first sealing member 250 and the rear end of the gas pocket 231 may be sealed with the second sealing member 251.

Generally, in the compressor using the gas bearing means, the spacing of the gas pockets 231 is about 150 micrometers. As such, the assembling process may be facilitated by placing a margin corresponding to the assembly tolerance.

In the embodiment of the present disclosure, the spacing of the gas pocket 231 may be in a range of 10 micrometers to 30 micrometers. That is, the gap (tolerance) between the inner circumferential surface of the frame body 221 and the outer circumferential surface of the cylinder 240 is provided in a range of 10 micrometers to 30 micrometers.

Figure 26:
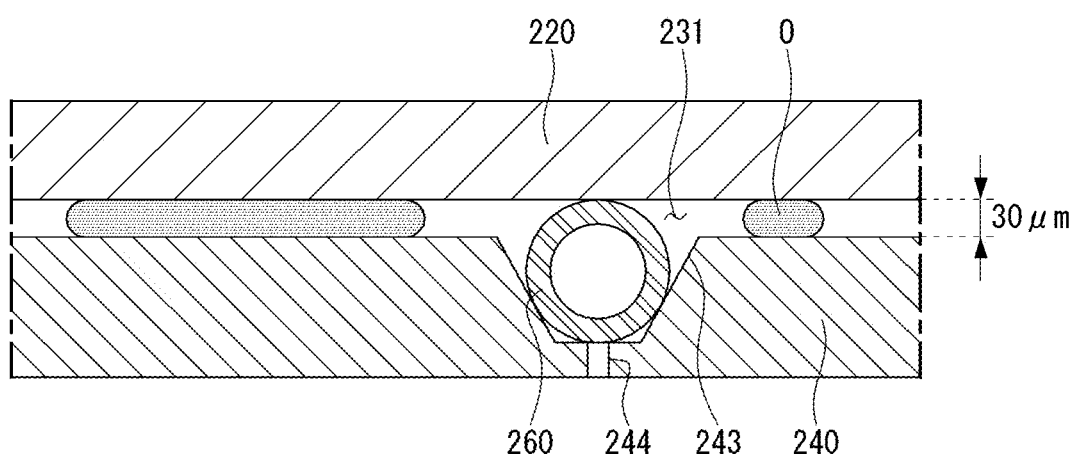
FIG. 26 is a view for explaining a phenomenon in which oil cannot be introduced into a cylinder due to friction.

FIG. 26 is a view for explaining a phenomenon in which oil cannot be introduced into a cylinder due to friction.

Referring to FIG. 26, when the spacing of the gas pocket 231 is 30 micrometers or less, the oil O is prevented from flowing into the gas inlet 232 due to the surface frictional force of the gas pocket 231. The surface frictional force of the oil increases as the spacing of the gas pocket 231 decreases. This is associated with the compression of the oil O as the spacing of the gas pocket 231 decreases. That is, when the spacing of the gas pocket 231 is 30 micrometers, the frictional force of the oil O and the stress applied to the oil O are equal to each other, or the frictional force becomes larger.

In addition, the oil O collected in the gap of the gas pocket 231 may be expected to serve as a filter for trapping foreign substances moving to the sliding portion.

When the spacing of the gas pocket 231 is 10 micrometers or more, the pressure drop in the gas inlet 243 satisfies the lubrication performance criterion at a level of 0.35 bar.

In this way, the structure that prevents oil from penetrating into the sliding portion by reducing the assembly tolerance between the cylinder 240 and the frame 220 is not adding specific parts or machining processing, thereby improving the reliability without increasing costs.

Figure 27:
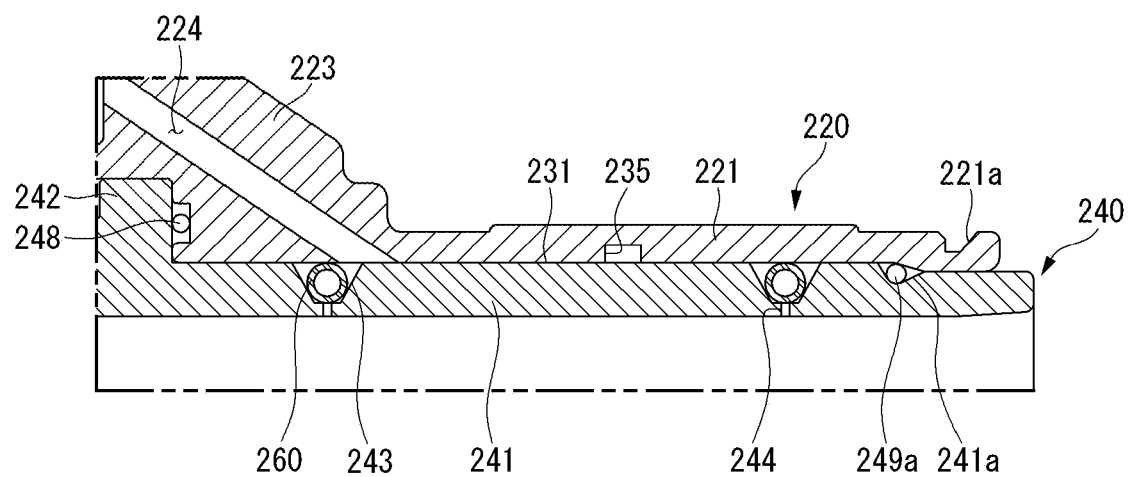
FIG. 27 is a cross-sectional view showing a modification of FIG. 25.

FIG. 27 is a cross-sectional view showing a modification of FIG. 25.

Referring to FIG. 27, a collection groove 235 may be formed on the inner circumferential surface of the frame body 221 so that oil or foreign substances in the gap of the gas pocket 231 may be collected.

The collection groove 235 may be recessed in a radial direction from an inner circumferential surface of a frame body 221. The collection groove 235 may extend in a circumferential direction of the frame body 221.

For example, the collection groove 235 may extend 360° in a circular shape, or a plurality of collection grooves 235 may be spaced apart from each other in the circumferential direction of the frame body 221.

The collection groove 235 may be formed on the inner circumferential surface of the frame body 221, or may be formed on the outer circumferential surface of the cylinder body 241. However, in order to prevent deformation of a cylinder 240, it may be preferable to form the collection groove 235 on the inner circumferential surface of the frame body 221.

In addition, the collection groove 235 may be positioned between a front gas inlet and a rear gas inlet.

Since the collection groove 235 has a relatively larger depth than a gap distance of the gas pocket 231, oil or foreign substances collected in the collection groove 235 does not flow into the gas pocket 231 again, but remains in the collection groove 235.

Figure 28:
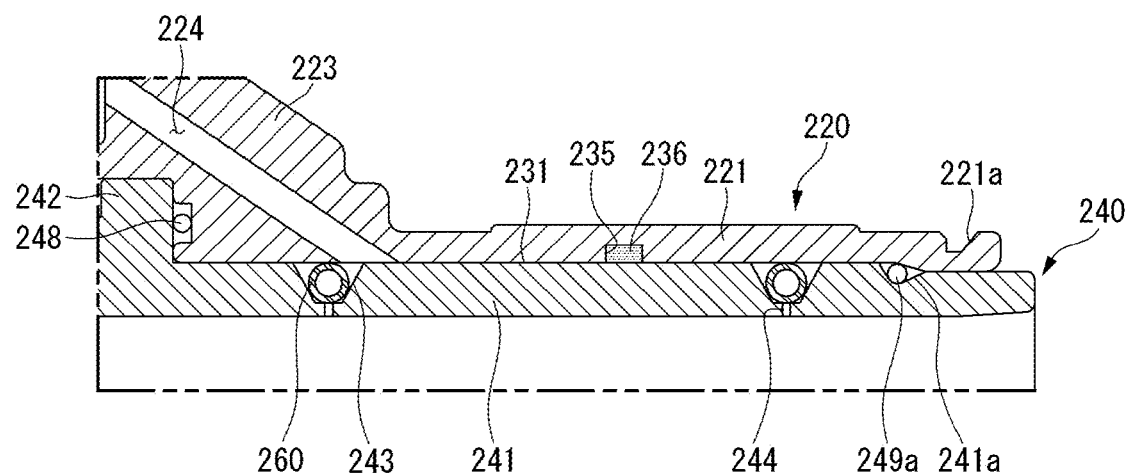
FIG. 28 is a cross-sectional view showing anther modification of FIG. 25.

FIG. 28 is a cross-sectional view showing another modification of FIG. 25.

Referring to FIG. 28, a porous material 236 capable of absorbing oil or foreign substances may be inserted into a collection groove 235. The porous material 236 may be provided in a shape corresponding to the shape of the collection groove 235.

For example, when the collection groove 235 extends 360° in a circumferential direction, the porous material 236 may be provided in a ring shape.

The porous material 236 may be designed to minimize flow resistance of refrigerant gas while absorbing oil or foreign substances. For example, the porous material 236 may have pores so that only particles having a diameter of 5 micrometers or less can pass.

Certain or other embodiments of the present disclosure described above are not mutually exclusive or distinct. Certain or other embodiments of the present disclosure described above may use or combine their respective configurations or functions.

For example, it means that configuration A described in a specific embodiment and/or drawing may be combined with configuration B described in another embodiment and/or drawing. That is, even when the combination between the elements is not directly described, it means that the combination is possible except for the case where the combination is described as impossible.

Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The compressor according to the present disclosure is capable of preventing oil from flowing into a sliding portion by maintaining uniform filter performance without decreasing filter performance due to a decrease in filter tension during compressor operation, and the like. This can be made possible by reducing the gap between the cylinder and the frame and increasing the surface friction acting on the oil, thereby preventing the oil from moving within the gas inlet. With this effect, the compressor according to the present disclosure can minimize the contact between the piston and the cylinder, thereby improving the durability and reliability.

In addition, according to at least one of the embodiments of the present disclosure, it is easy to mount the filter member on the gas inlet, and uniform filter performance can be expected regardless of the mounting process, thereby ensuring reliability.

Furthermore, according to at least one of the embodiments of the present disclosure, maintenance and replacement of the filter member is easy, and performance deviation may not occur depending on the operator.

What is claimed is:

1. A compressor comprising:
   a cylinder that includes a cylinder body and that defines a compression space for receiving a refrigerant gas;
   a piston that is configured to reciprocate within the cylinder body and compress the refrigerant gas in the compression space; and
   a frame that receives the cylinder and defines a gas hole, wherein the gas hole fluidly communicates with an outside of the frame and allows introduction of the refrigerant gas into an interior of the frame,
   wherein the gas hole fluidly communicates with a gas pocket that is defined between an outer circumferential surface of the cylinder and an inner circumferential surface of the frame,
   wherein the cylinder comprises:
      a nozzle that extends through the cylinder body and enables the gas pocket to fluidly communicate with an inner space of the cylinder body;
      a gas inlet that includes a first groove at the outer circumferential surface of the cylinder and that fluidly communicates with an inlet of the nozzle; and
      a porous filter that is seated in the gas inlet and configured to filter the refrigerant gas introduced into the nozzle, and wherein the porous filter includes a hollow tube shape that defines an inner passage through which the refrigerant gas flows.

2. The compressor according to claim 1, wherein the porous filter defines fine holes and is configured to filter oil or dirt from the refrigerant gas that flows through the gas pocket, and
wherein the fine holes are configured to prevent oil or dirt of 20 micrometers or greater from passing from the gas pocket to the nozzle.

3. The compressor according to claim 1, wherein the gas inlet extends along an outer circumferential surface of the cylinder body in a circumferential direction, and
wherein the porous filter at least partially surrounds the cylinder body in the circumferential direction.

4. The compressor according to claim 3, wherein the porous filter includes a ring shape that surrounds the cylinder body, and
wherein the porous filter is configured to be elastic and contacts an inner wall of the gas inlet.

5. The compressor according to claim 3, wherein the porous filter includes a ring shape that surrounds the cylinder body, and
wherein a diameter of a cross-section of the porous filter is greater than a width of the gas inlet so that the porous filter is press-fitted to the gas inlet.

6. The compressor according to claim 3, wherein the porous filter includes a ring shape that surrounds the cylinder body and is bonded to an inner wall of the gas inlet by a thermosetting resin.

7. The compressor according to claim 3, wherein the porous filter includes a ring shape that has a partially cut-out portion and that surrounds the cylinder body,
wherein the compressor further comprises a connector that has opposite ends, and
wherein the opposite ends of the connector are respectively inserted into a first cut-out end and a second cut-out end of the porous filter and connect the porous filter.

8. The compressor according to claim 7, wherein the porous filter includes a hollow tube shape that defines an inner passage through which the refrigerant gas flows, and
wherein the connector seals the first cut-out end and the second cut-out end of the porous filter and seals the inner passage.

9. The compressor according to claim 3, wherein the porous filter includes a ring shape that has a partially cut-out portion and that surrounds the cylinder body, and
wherein a first cut-out end of the porous filter is inserted into a second cut-out end of the porous filter to define a complete ring shape of the porous filter.

10. The compressor according to claim 9, wherein the first cut-out end of the porous filter comprises a coupling protrusion, and the second cut-out end of the porous filter includes a coupling groove that corresponds to the coupling protrusion and is configured to receive the coupling protrusion.

11. The compressor according to claim 1, wherein the gas inlet defines a third groove that extends in a longitudinal direction of the cylinder body, and
wherein the porous filter extends in the longitudinal direction of the cylinder body.

12. The compressor according to claim 11, wherein the nozzle is a first nozzle that is positioned at a first side of the cylinder body,
wherein the cylinder further comprises a second nozzle that is positioned at a second side of the cylinder body that is opposite to the first side of the cylinder body, and
wherein the porous filter extends from a position corresponding to the first nozzle to a position corresponding to the second nozzle.

13. The compressor according to claim 11, wherein the nozzle is a first nozzle that is positioned at a first side of the cylinder body,
wherein the cylinder further comprises a second nozzle that is positioned at a second side of the cylinder body that is opposite to the first side of the cylinder body, and
wherein the compressor further comprises a front porous filter and a rear porous filter that are configured to respectively filter refrigerant gas introduced into the first nozzle and the second nozzle.

14. The compressor according to claim 11,
wherein the porous filter is seated in the gas inlet and pressed and deformed between the inner circumferential surface of the frame and an outer circumferential surface of the cylinder body, and
wherein openings at opposite ends of the porous filter are sealed by side surfaces of the gas inlet.

15. The compressor according to claim 1, wherein the porous filter comprises a porous polymer.

16. The compressor according to claim 1, wherein the porous filter comprises at least one of PTFE (polytetrafluoroethylene), ePTFE (expanded polytetrafluoroethylene), UHMWPE (Ultra High Molecular Weight Polyethylene), PE (polyethylene), PA (polyamide), PVDF (polyvinylidene fluoride), or PP (polypropylene).

17. A compressor comprising:
a cylinder that includes a cylinder body and that defines a compression space for receiving a refrigerant gas;
a piston that is configured to reciprocate within the cylinder body and compress the refrigerant gas in the compression space; and
a frame that receives the cylinder and defines a gas hole, wherein the gas hole fluidly communicates with an outside of the frame and allows introduction of the refrigerant gas into an interior of the frame,
wherein the gas hole fluidly communicates with a gas pocket that is defined between an outer circumferential surface of the cylinder and an inner circumferential surface of the frame,
wherein the cylinder comprises:
a nozzle that extends through the cylinder body and enables the gas pocket to fluidly communicate with an inner space of the cylinder body;
a gas inlet that includes a first groove at the outer circumferential surface of the cylinder and that fluidly communicates with an inlet of the nozzle; and
a porous filter that is seated in the gas inlet and configured to filter the refrigerant gas introduced into the nozzle, and
wherein the gas pocket defines spacing between the inner circumferential surface of the frame and an outer circumferential surface of the cylinder body in a range of 10 micrometers to 30 micrometers.

18. The compressor according to claim 17, further comprising:
a front sealing member that is positioned closer to a front side of the gas hole than an outlet of the gas hole and that is disposed between the cylinder and the frame so as to seal the front side of the gas hole; and
a rear sealing member that is positioned closer to a rear side of the gas hole than the outlet of the gas hole and that is disposed between the cylinder and the frame so as to seal the rear side of the gas hole, the rear side of the gas hole being opposite to the front side of the gas hole, and wherein the gas pocket includes a space between the front sealing member and the rear sealing member.

19. A compressor comprising:

a cylinder that includes a cylinder body and that defines a compression space for receiving a refrigerant gas;

a piston that is configured to reciprocate within the cylinder body and compress the refrigerant gas in the compression space; and a frame that receives the cylinder and defines a gas hole, wherein the gas hole fluidly communicates with an outside of the frame and allows introduction of the refrigerant gas into an interior of the frame, wherein the gas hole fluidly communicates with a gas pocket that is defined between an outer circumferential surface of the cylinder and an inner circumferential surface of the frame, wherein the cylinder comprises:

a nozzle that extends through the cylinder body and enables the gas pocket to fluidly communicate with an inner space of the cylinder body;

a gas inlet that includes a first groove at the outer circumferential surface of the cylinder and that fluidly communicates with an inlet of the nozzle; and a porous filter that is seated in the gas inlet and configured to filter the refrigerant gas introduced into the nozzle, and wherein the compressor further comprises collection grooves that fluidly communicate with the gas pocket, that are recessed in a radial direction, and that are configured to collect oil or foreign substances, wherein the collection grooves are defined at the inner circumferential surface of the frame or an outer circumferential surface of the cylinder body.

* * * * *